US008670186B2

(12) United States Patent
Kawamura

(10) Patent No.: US 8,670,186 B2
(45) Date of Patent: Mar. 11, 2014

(54) ZOOM LENS AND IMAGE PICKUP APPARATUS

(71) Applicant: FujiFilm, Tokyo (JP)

(72) Inventor: Daiki Kawamura, Saitama-ken (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 13/858,340

(22) Filed: Apr. 8, 2013

(65) Prior Publication Data

US 2013/0222924 A1    Aug. 29, 2013

Related U.S. Application Data

(63) Continuation of application No. PCT/JP2011/005623, filed on Oct. 5, 2011.

(30) Foreign Application Priority Data

Oct. 8, 2010   (JP) .................................. 2010-228162

(51) Int. Cl.
    *G02B 15/14*      (2006.01)

(52) U.S. Cl.
    USPC ......................................................... 359/686

(58) Field of Classification Search
    USPC .................... 359/684, 686, 687, 772
    See application file for complete search history.

(56) References Cited

U.S. PATENT DOCUMENTS 6,124,983 A * 9/2000 Yahagi et al. ................. 359/687
6,476,977 B1 11/2002 Ito

FOREIGN PATENT DOCUMENTS

| JP | 2000-081572 | 3/2000 |
| JP | 2000-321495 | 11/2000 |
| JP | 2004-279489 | 10/2004 |
| JP | 3800843 | 7/2006 |
| JP | 4194876 | 12/2008 |
| JP | 2009-037105 | 2/2009 |
| JP | 4447703 | 4/2010 |

* cited by examiner

*Primary Examiner* — Joseph P Martinez
(74) *Attorney, Agent, or Firm* — Young & Thompson

(57) ABSTRACT

Disposing from an object side in the order of a positive first lens group which is fixed at the time of zooming, a negative second lens group which is moved at the time of zooming, an aperture stop, a positive third lens group which is fixed at the time of zooming, and a fourth lens group which is moved along the optical axis at the time of zooming to correct a change in image plane position arising from the zooming for focusing. When a refractive index of the third group first lens with respect to d-line, a focal length of the third group, and focal lengths of the overall lens system at a wide angle end and a telephoto end are taken as Nd31, f3, fw, and ft respectively, conditional expressions (1): $1.77<Nd31$ and (2): $0.8<f3/(fw \cdot ft)^{1/2}<1.6$ are simultaneously satisfied.

20 Claims, 23 Drawing Sheets

FIG.3 EXAMPLE 2

FIG.13
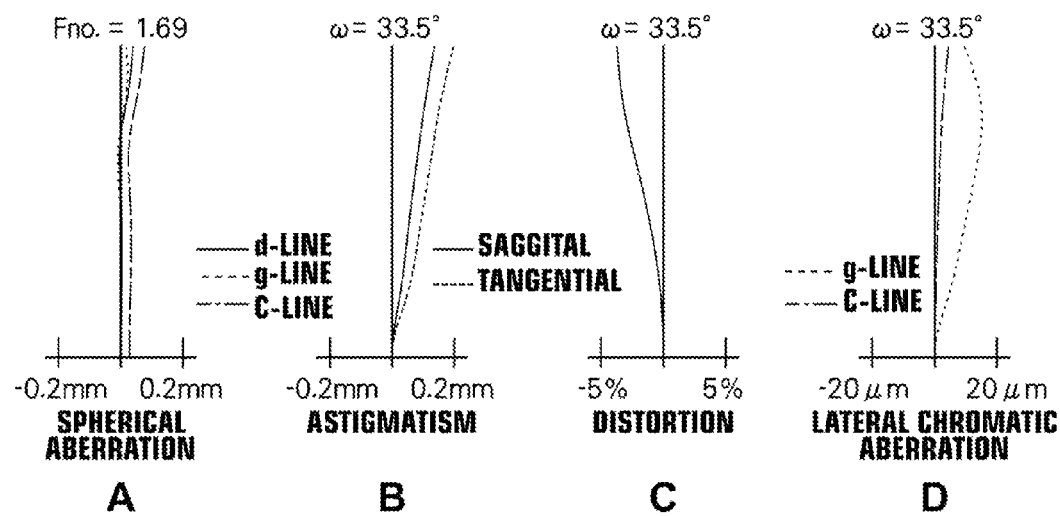
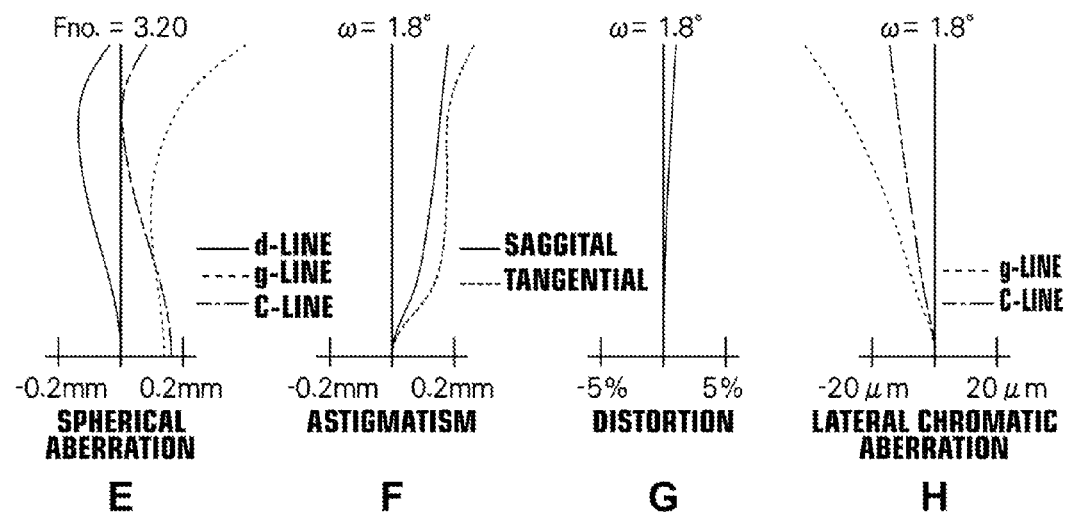

FIG.14
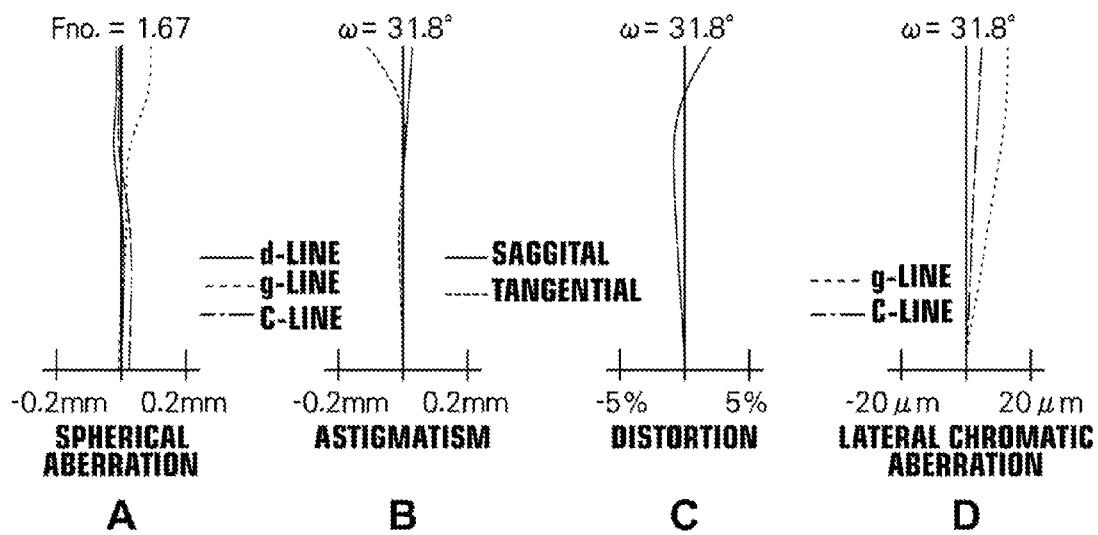
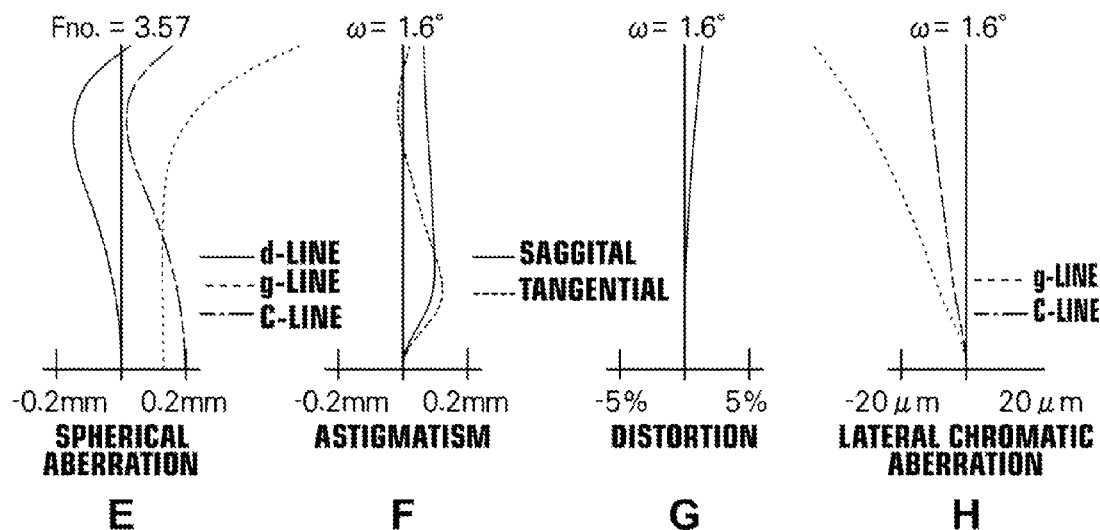

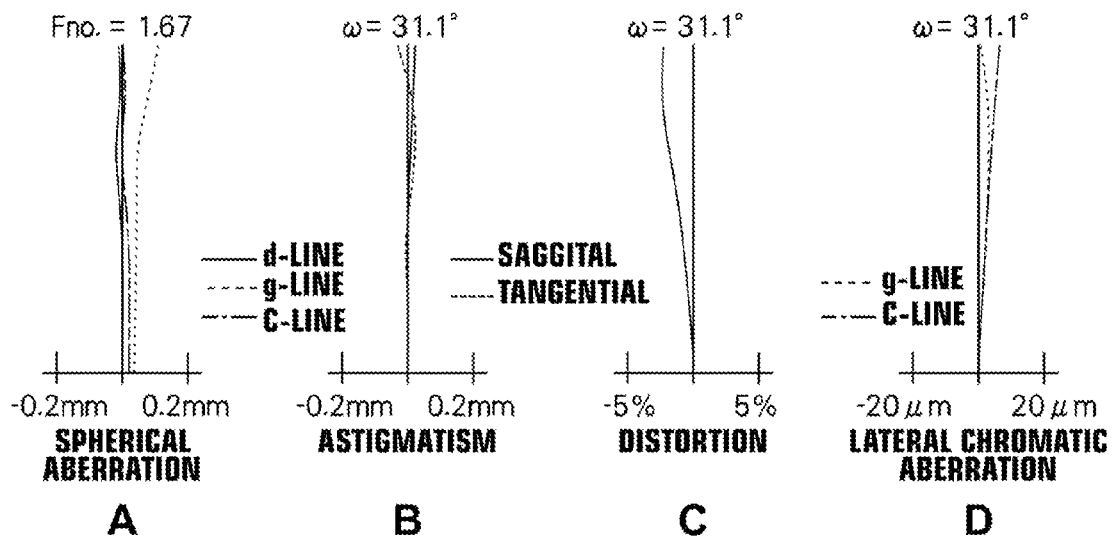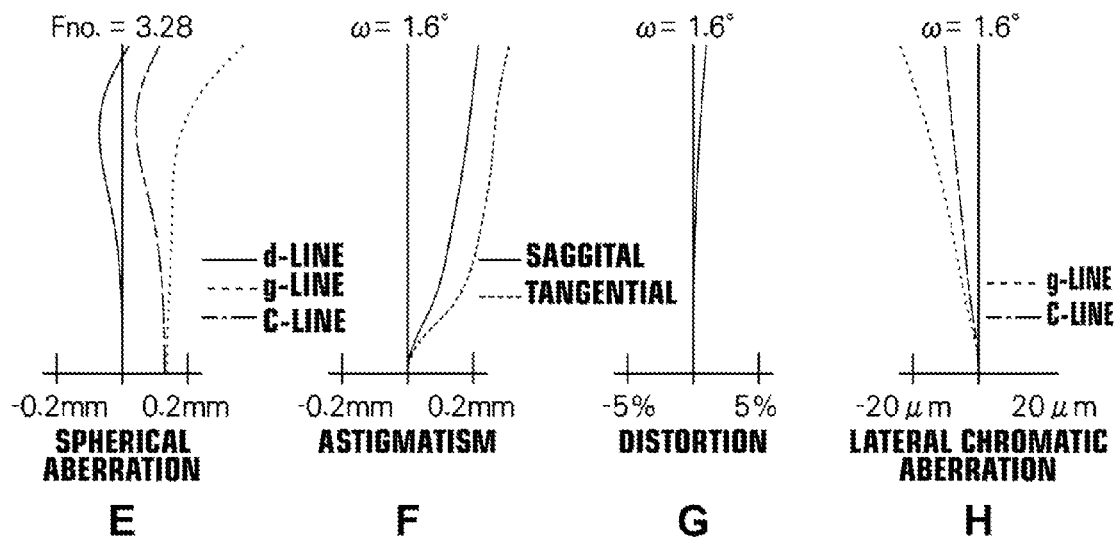

FIG.16
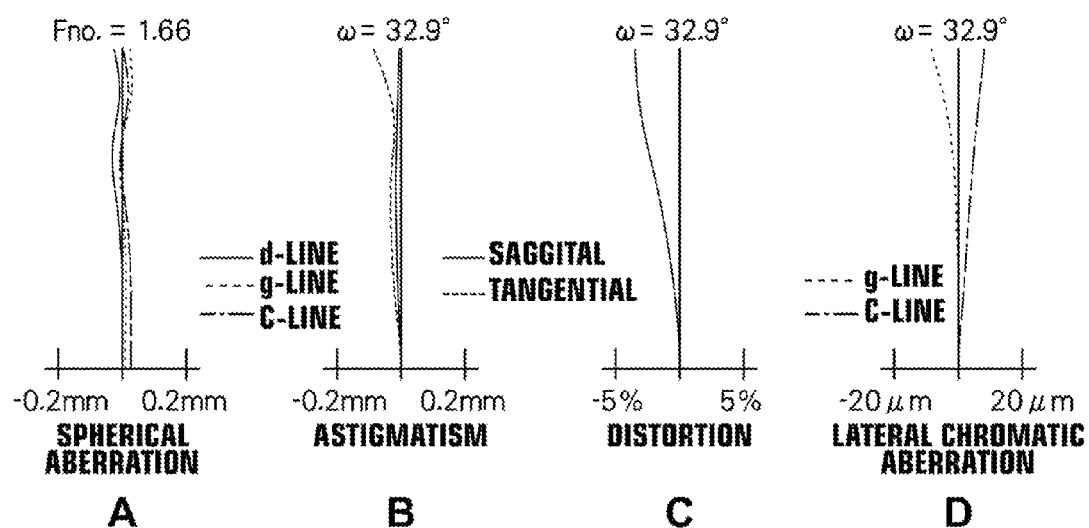
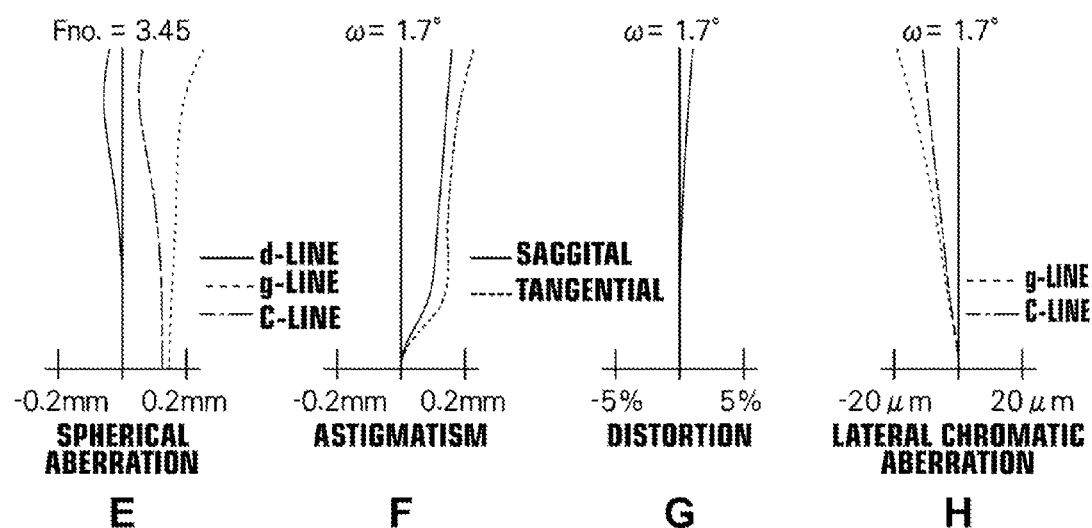

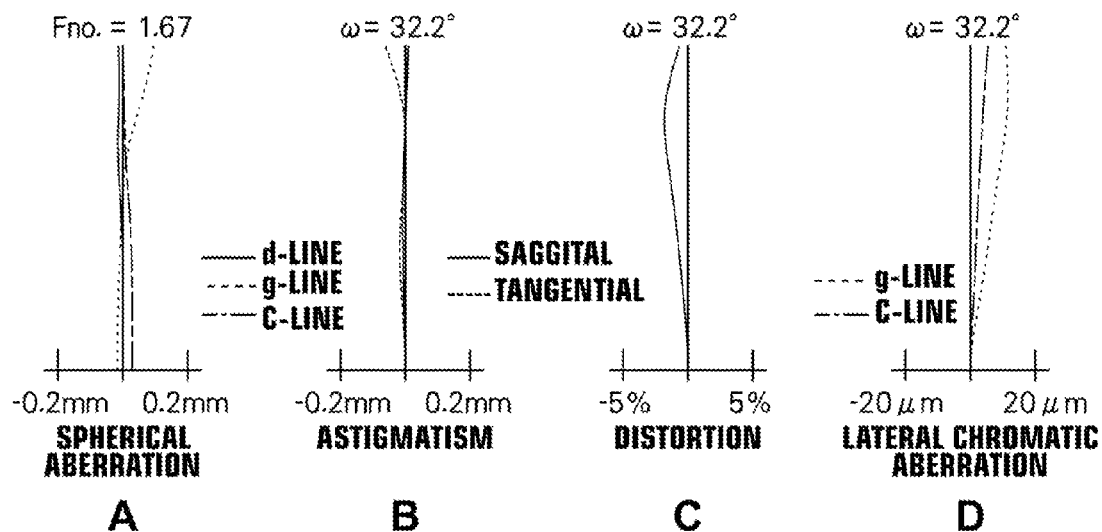
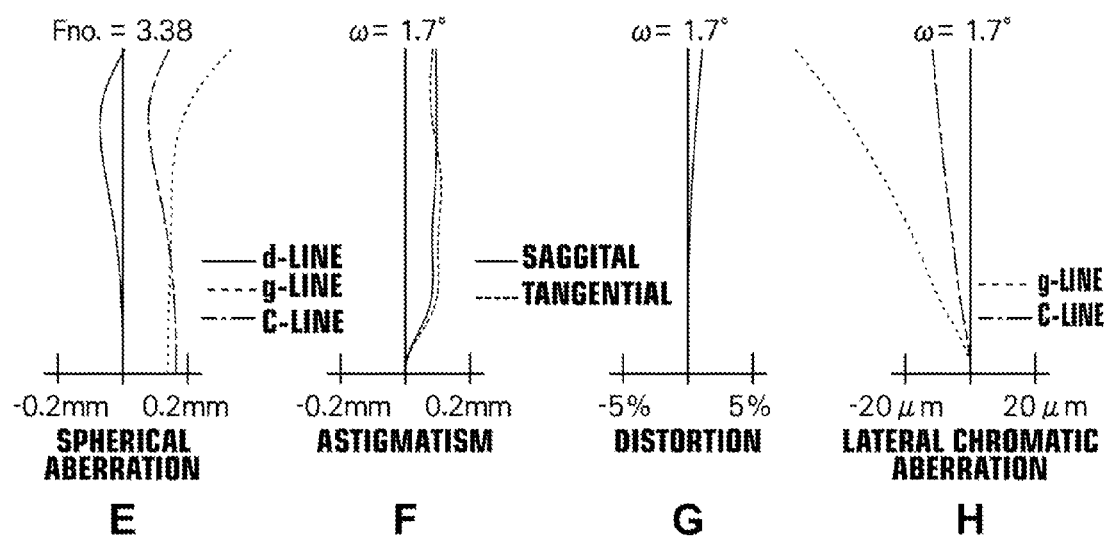
FIG.17

FIG.18
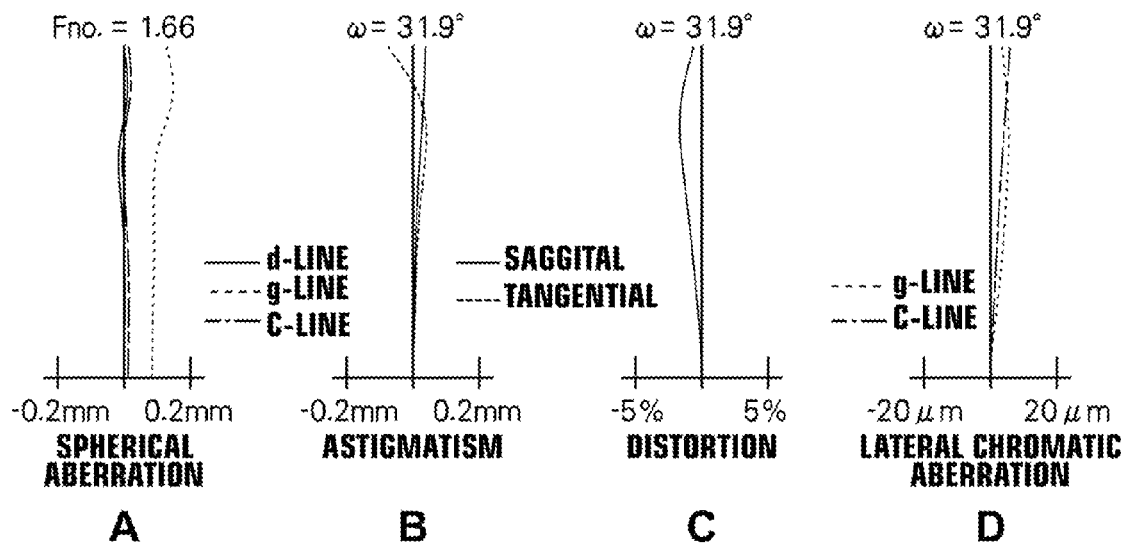
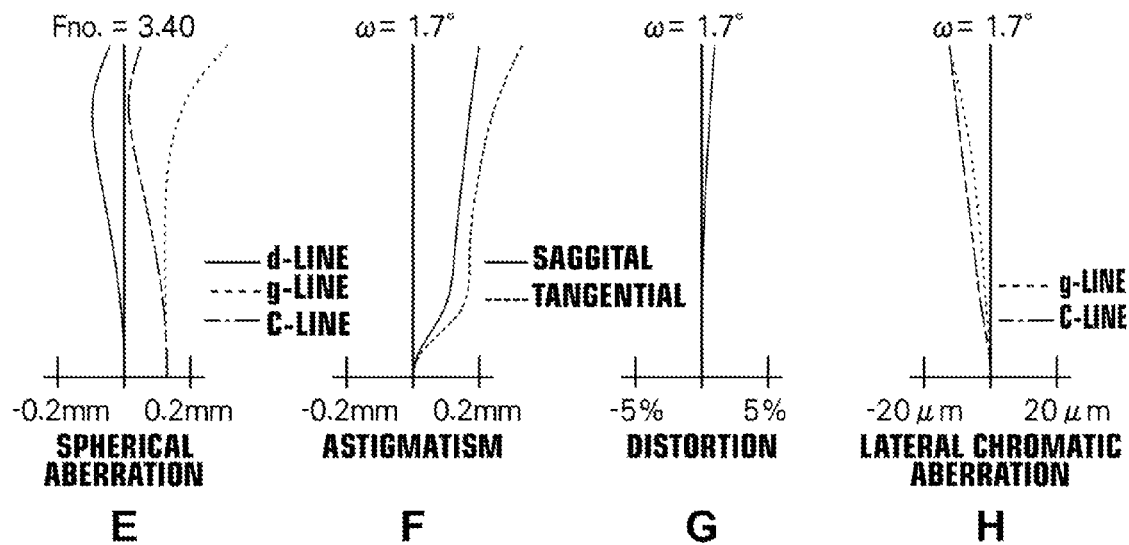

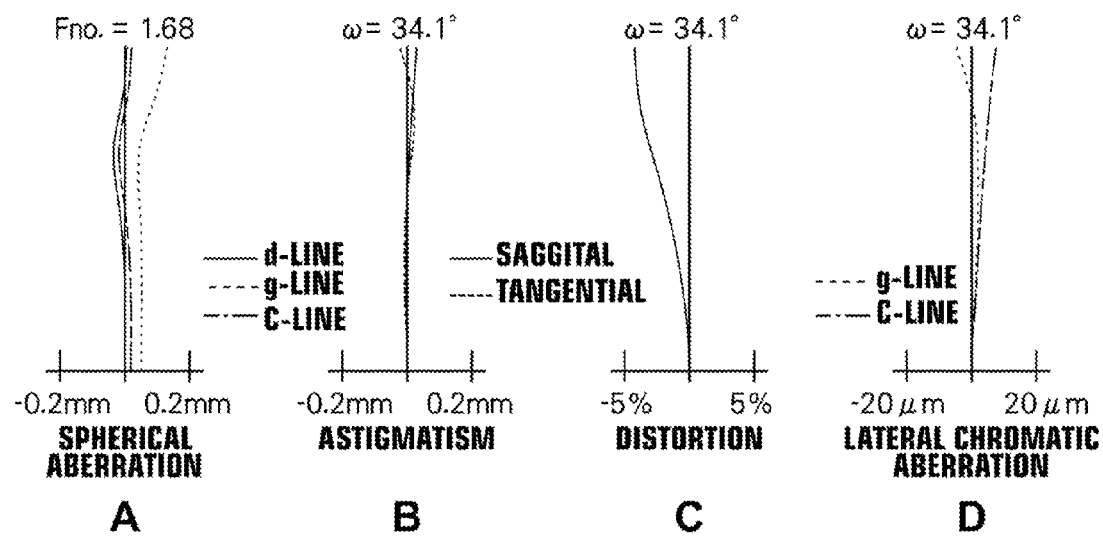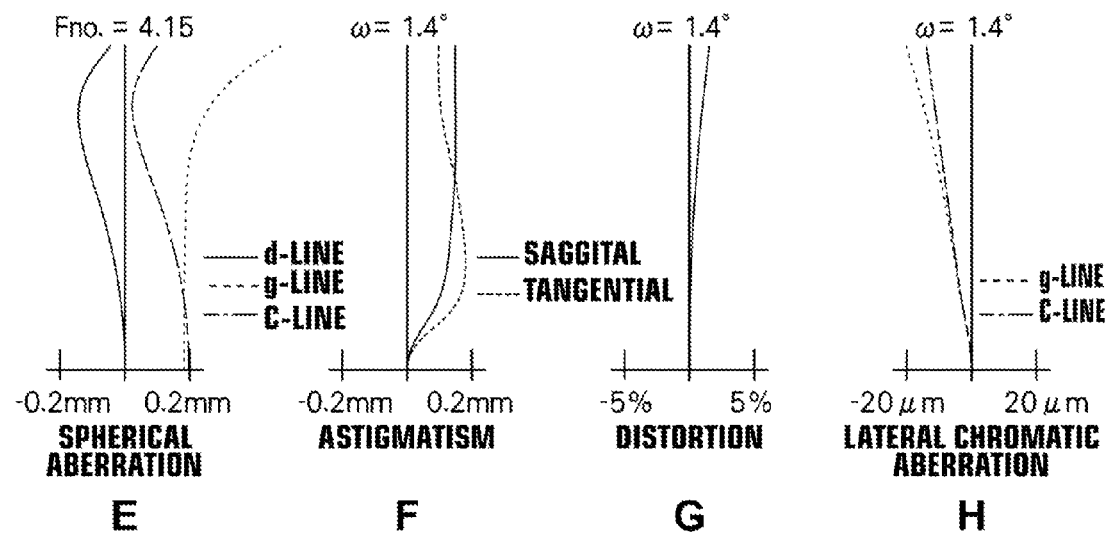
FIG.19

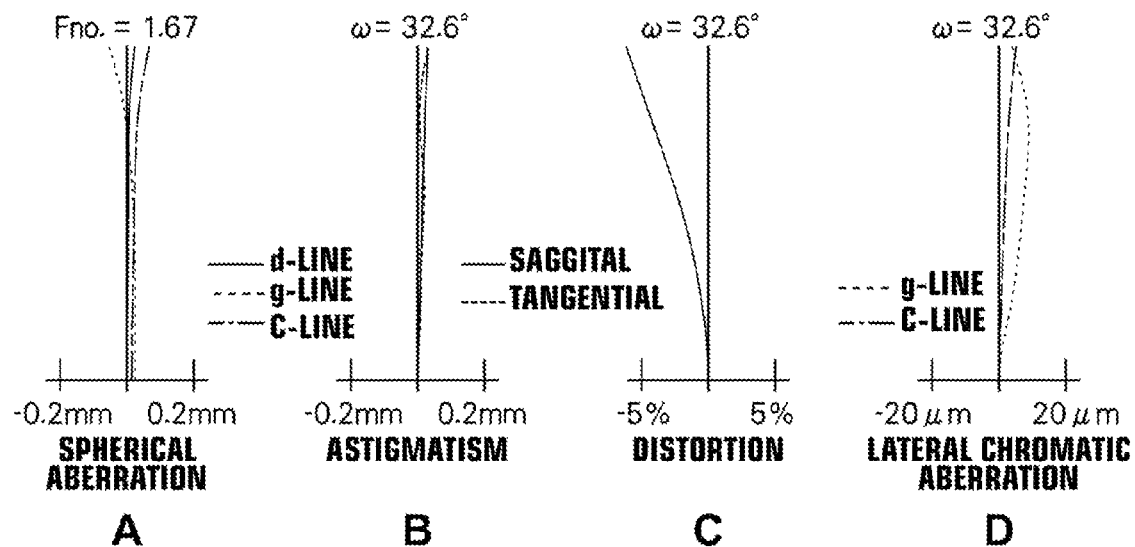
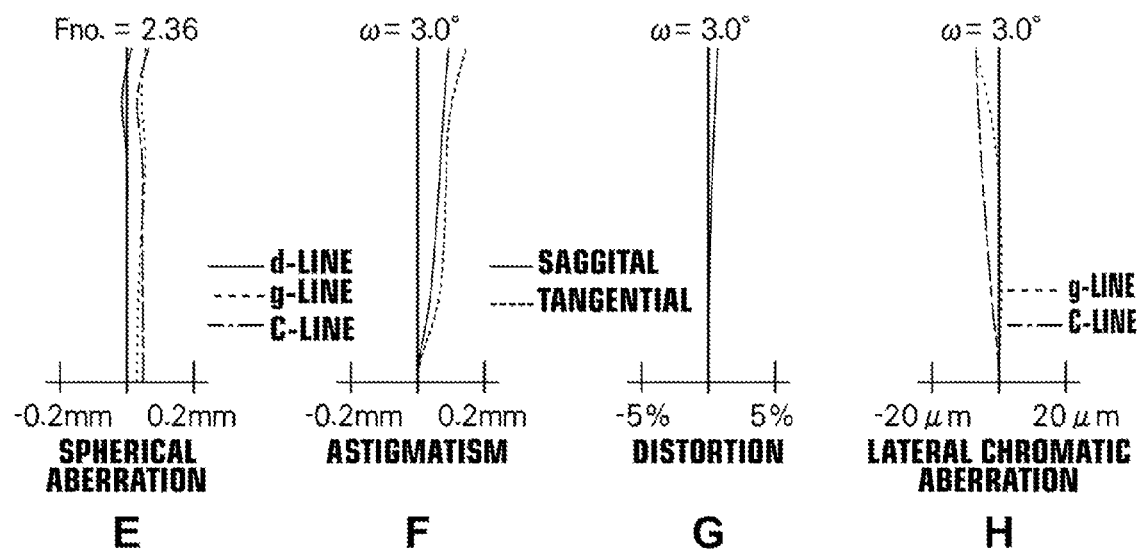
FIG.20

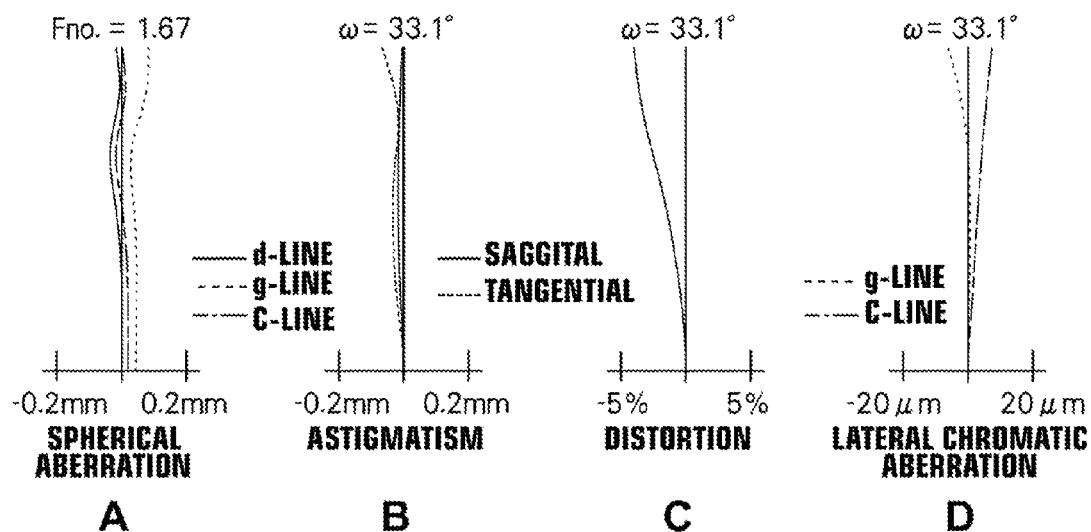
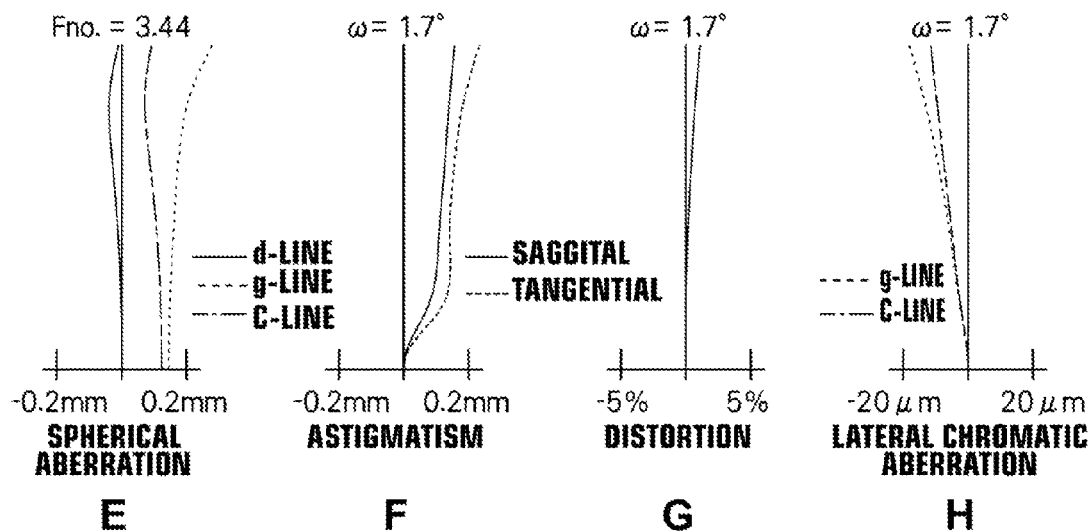
FIG.21

FIG.22
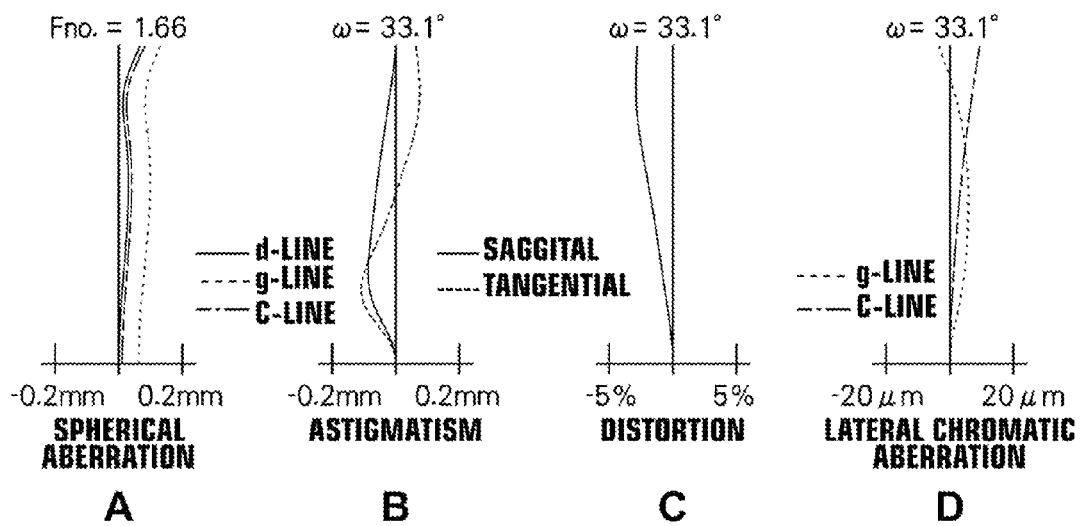
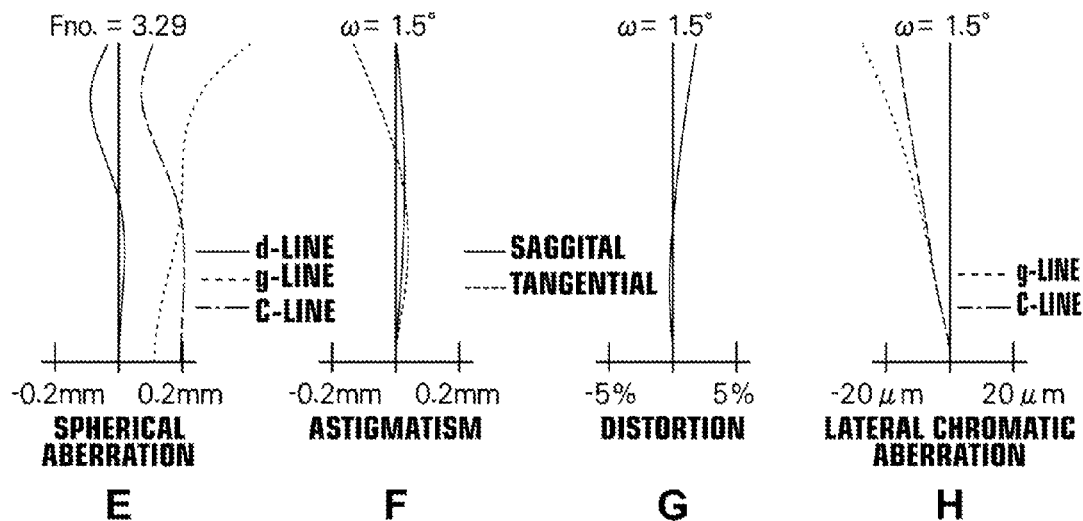

FIG.23
EXAMPLE 11
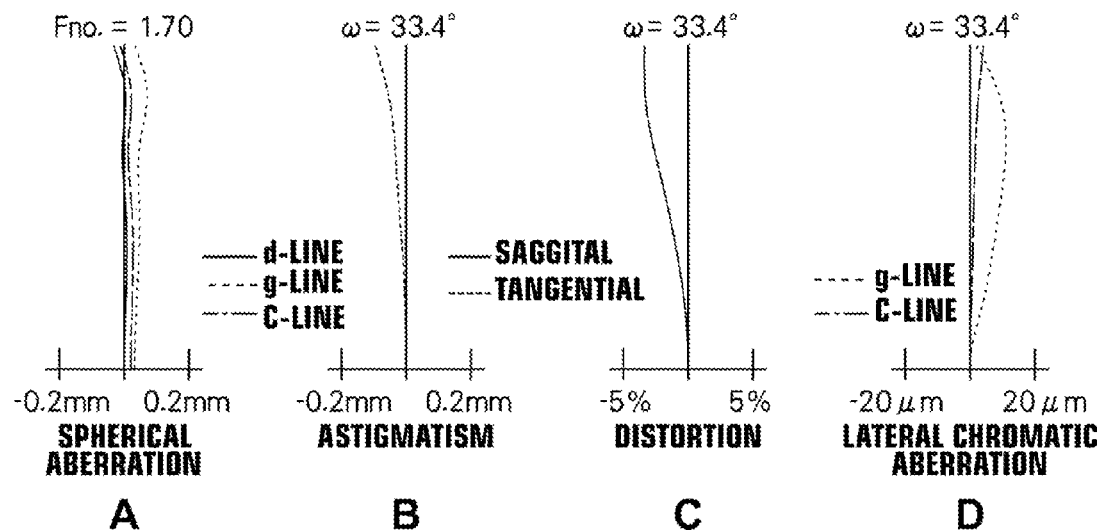
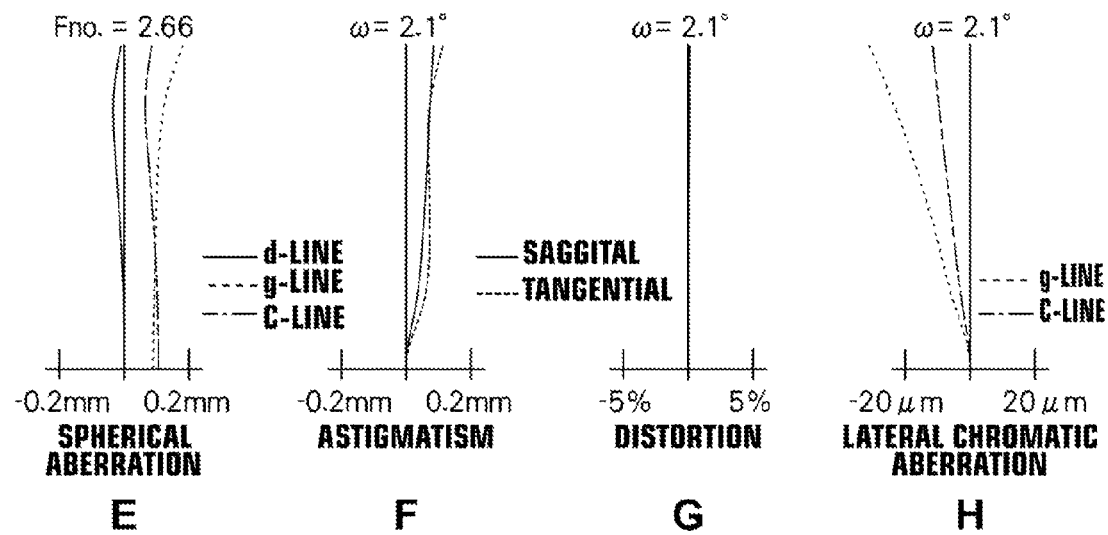

ZOOM LENS AND IMAGE PICKUP APPARATUS

TECHNICAL FIELD

The present invention relates to a zoom lens having four lens groups and an image pickup apparatus equipped with the zoom lens.

BACKGROUND ART

Heretofore, zoom lenses having four lens groups are widely known as general zoom lenses installed on image pickup devices, such as consumer video cameras, surveillance cameras, and the like. The zoom lens includes a first lens group having a positive power, a second lens group having a negative power, a third lens group having a positive power, and a fourth lens group having a positive power arranged in this order from the object side and, when zooming, while the second lens group is moved in a optical axis direction, the fourth lens group is moved in order to correct the position of image plane associated with the zooming and to bring the zoom lens into focus. Further, a zoom lens of five lens groups in which a fifth lens group is added as a fixed lens group is also known.

A strong demand exists in the image pickup device described above to increase the zoom ratio while maintaining or even reducing the current size. For example, in monitoring applications and the like, there may be a case in which the image pickup device is required to conform to a specific standard size with enhanced specifications. There may also be a case in which there is no choice but to sacrifice somewhat optical performance when a specification, such as the zoom ratio, is enhanced. In such a case, it is important to assess and determine optical properties which should be prioritized and those allowed to be degraded to a certain extent, and to combine each component such that appropriate performance may be obtained.

For example, in zoom lenses of four-group or five-group configuration, if an attention is paid to lens configurations from the third and a subsequent lens groups, third lens groups configured with a less number of lenses, i.e., with two lenses are known as described, for example, in Japanese Patent Nos. 4194876 and 4447703. The third lens group described above is configured with two lenses: a positive lens and a negative lens having a meniscus shape with a concave surface on the image side. Further, the materials used for the two lenses are quite similar, in which a material having a refractive index of about 1.6 with an Abbe number of about 59 is used for the positive lens and a material having a refractive index of about 1.85 with an Abbe number of about 24 is used for the negative lens. Third lens groups having a similar configuration to that described above are commonly found and a relatively low dispersion material is generally used for the positive lens, as in the aforementioned example.

Low dispersion materials have also a low refractive index and, in most cases, materials having a refractive index of not greater than 1.6 are used, as described above. But, there may be a case in which the positive lens of the third lens group is formed using a relatively high refractive index material. For example, a zoom lens in which the positive lens of the third lens group is formed using a material having a refractive index of 1.74 with an Abbe number of 44.9 is known as described, for example, in Japanese Unexamined Patent Publication No. 2000-321495. Further, as a very rare case, a zoom lens in which the positive lens of the third lens group is formed using a material having a refractive index greater than 1.8 is also known as described, for example, in Japanese Patent No. 3800847 and Japanese Unexamined Patent Publication No, 2000-081572.

DISCLOSURE OF THE INVENTION

In the mean time, it is considered that the use of a high refractive index material is very effective means for downsizing an optical system. If a low refractive index and low dispersion material that has been used for the positive lens is replaced directly with a high refractive and high dispersion material, however, there arises a problem that, for example, the chromatic aberration is increased. Therefore, it is necessary to balance with optical properties (refractive index and dispersion) of the material used for the positive lens disposed in the forth lens group which has the same positive power and is located adjacent to the third lens group or in the fifth lens group.

Taking balance simply refers to take balance by disposing a low dispersion material that causes an excessive correction of chromatic aberration in the fourth lens group in order to compensate for the insufficient correction of the chromatic aberration. But, the balancing depends on the F-number, zoom ratio, and the like, so that it is necessary to select an optimum material in each case.

For example, in order to reduce the change in aberration arising from the movement of the fourth lens group that assumes image plane correction for focusing, it is effective to use a low dispersion material in the fourth lens group. On the other hand, if a low refractive index low dispersion material is used for the positive lens of the fourth lens group, a strong power can not be given to the fourth lens group. In such a case, it may be considered to keep the balance between downsizing and a high zoom ratio by using a high refractive index material and giving a strong power to the third lens group. Conversely, if the power of the third lens group is made too strong, there arises a problem that the correction of aberration, e.g., spherical aberration, becomes difficult. As described above, in implementing downsizing of zoom lenses with increased zoom ratios, there exists a demand for optimizing power distribution and selection of materials for the lenses of the third and fourth lens groups.

The present invention has been developed in view of the circumstances described above, and it is an object of the present invention to provide a zoom lens downsized with increased aperture and zoom rations, while minimizing aberrations.

A first zoom lens of the present invention is a zoom lens, substantially consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:

the third lens group is composed of a third group first lens which is a single lens with at least one surface being aspheric and has a positive power and a third group second lens which is a single lens with an image side surface being concave to the image side and has a negative power, disposed in this order from the object side; and when a refractive index of the third group first lens with respect to d-line, a focal length of the third lens group, and focal lengths of the overall lens system at a wide angle end and a telephoto end are taken as Nd31, f3, fw, and ft respectively, the zoom lens simultaneously satisfies conditional expressions (1): $1.77<Nd31$ and (2): $0.8<f3/(fw \cdot ft)^{1/2}<1.6$.

A second zoom lens of the present invention is a zoom lens, substantially consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:

the third lens group is composed of a third group first lens which is a single lens with at least one surface being aspheric and has a positive power and a third group second lens which is a single lens with an image side surface being concave to the image side and has a negative power, disposed in this order from the object side; and when a refractive index of the third group first lens with respect to d-line, a focal length of the fourth lens group, and focal lengths of the overall lens system at a wide angle end and a telephoto end are taken as Nd31, f4, fw, and ft respectively, the zoom lens simultaneously satisfies conditional expressions (3): $1.77<Nd31$ and (4): $0.55<f4/(fw \cdot ft)^{1/2}<0.82$.

A third zoom lens of the present invention is a zoom lens, substantially consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:

the third lens group is composed of a third group first lens which is a single lens with at least one surface being aspheric and has a positive power and a third group second lens which is a single meniscus lens with an image side surface being concave to the image side and has a negative power, disposed in this order from the object side;

the fourth lens group is composed of at lest one lens having a positive power; and when a refractive index of the third group first lens with respect to d-line, an Abbe number of the third group first lens with respect to d-line, a refractive index of the third group second lens with respect to d-line, an Abbe number of the third group second lens with respect to d-line, and a highest Abbe number of those of the positive lenses in the fourth lens group with respect to d-line are taken as Nd31, vd31, Nd32, vd32, and vd4p respectively, the zoom lens simultaneously satisfies conditional expressions (5): $1.72<Nd31$, (6): $36<vd31<52$, (7): $1.80<Nd32$, (8): $16<vd32<27$, and (9): $63<vd4p$.

When a local length of the fourth lens group, and focal lengths of the overall lens system at a wide angle end and a telephoto end are taken as f4, fw, and ft respectively, the first and third zoom lenses are preferable to satisfy a conditional expression (10) $0.5<f4/(fw \cdot ft)^{1/2}<1.2$.

When a local length of the third lens group, and focal lengths of the overall lens system at a wide angle end and a telephoto end are taken as f3, fw, and ft respectively, the zoom lenses described above is preferable to satisfy a conditional expression (11): $0.8<f3/(fw \cdot ft)^{1/2}<2.3$.

When an Abbe number of the third group first lens with respect to d-line is taken as vd31, the zoom lenses described above are preferable to satisfy a conditional expression (12): $36<vd31<52$.

When a refractive index of the third group second lens with respect to d-line and an Abbe number of the third group second lens with respect to d-line are taken as Nd32 and vd32 respectively, the zoom lenses described above are preferable to simultaneously satisfy conditional expressions (13): $1.80<Nd32$ and (14): $16<vd32<27$.

When the fourth lens group is composed of at least one lens having a positive power and a highest Abbe number of those of the positive lenses in the fourth lens group with respect to d-line is taken as vd4p, the zoom lenses described above are preferable to satisfy a conditional expression (15): $63<vd4p$.

When a focal length of the third lens group and a focal length of the fourth lens group are taken as f3 and f4 respectively, the zoom lenses described above are preferable to satisfy a conditional expression (16): $0.9<f3/f4<2.5$.

When a radius of curvature of an object side surface of the third group second lens and a radius of curvature of an image side surface of the third group second lens are taken as R32f and R32r respectively, the zoom lenses described above are preferable to satisfy a conditional expression (17): $3.2<(R32f+R32r)/(R32f-R32r)<8.0$.

When a distance from a most object side lens surface in the first lens group to an image forming plane on the optical axis and a focal length of the overall lens system at a telephoto end are taken as TL and ft respectively, the zoom lenses described above are preferable to satisfy a conditional expression (18): $0.62<TL/ft<1.10$.

Preferably, the fourth lens group of the zoom lenses described above is composed of two positive lenses and one negative lens.

Preferably, the fourth lens group of the zoom lenses described above is composed of a fourth group first lens having a positive power, a fourth group second lens having a negative power, and a fourth group third lens having a positive power disposed in this order from the object side.

When a radius of curvature of an object side surface of the fourth group second lens and a radius of curvature of an image side surface of the fourth group second lens are taken as R42f and R42r respectively, the zoom lenses described above are preferable to satisfy a conditional expression (19): $-6.0<(R42f+R42r)/(R42f-R42r)<-1.3$.

Preferably, each lens disposed in the fourth lens group of the zoom lenses described above is a double-sided spherical single lens.

Preferably, the first lens group of the zoom lenses described above is composed of a first group first lens having a negative power, a first group second lens having a positive power, a first group third lens having a positive power, and a first group fourth lens having a positive power, disposed in this order from the object side.

When a focal length of the first lend group and a focal length of the overall lens system at a telephoto end are taken as f1 and ft respectively, the zoom lenses described above are preferable to satisfy a conditional expression (20): $0.25<f1/ft<0.50$.

When a focal length of the second lens group, a focal length of the overall lens system at a wide angle end, and a focal length of the overall lens system at a telephoto end are taken as f2, fw, and ft respectively, the zoom lenses described above are preferable to satisfy a conditional expression (21): $0.25<|f2|/(fw \cdot ft)^{1/2}<0.45$.

An image pickup apparatus of the present invention is an apparatus, comprising any of the first to third zoom lenses.

In the case where a cemented lens is included and if the cemented lens is composed of n lenses, the n lenses are counted in the total number of lenses of the cemented lens.

In the case where a lens surface is aspheric, the concavity or convexity, positive or negative for the refractive power, radius of curvature, and the like, of the lens surface are defined in the paraxial region. The sign of a radius of curvature of a lens is positive if it is convex to the object side and negative if it is convex to the image side.

According to the first zoom lens and image pickup apparatus of the present invention, a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing are disposed in this order from an object side, in which the third lens group is composed of a third group first lens which is a single lens with at least one surface being aspheric and has a positive power and a third group second lens which is a single lens with an image side surface being concave to the image side and has a negative power, disposed in this order from the object side, and when a refractive index of the third group first lens with respect to d-line, a focal length of the third lens group, and focal lengths of the overall lens system at a wide angle end and a telephoto end are taken as Nd31, f3, fw, and ft respectively, conditional expressions (1): $1.77<Nd31$ and (2): $0.8<f3/(fw \cdot ft)^{1/2}<1.6$ are simultaneously satisfied. This allows downsizing with increased aperture and zoom ratios to be achieved while minimizing aberrations.

Here, the conditional expression (1) specifies the refractive index of the third group first lens. If the zoom lens is configured to fall below the lower limit of the conditional expression (1), the curvature (e.g., paraxial curvature) of the lens surface of the third group first lens needs to be increased in order to increase the refractive power of the third group first lens and the correction of aberrations, such as spherical aberration, becomes difficult. If the zoom lens is configured to fall below the lower limit of the conditional expression (1) while trying to correct aberrations satisfactorily, there arises a problem that the overall lens length needs to be increased.

The conditional expression (2) specifies the relationship between the focal length of the third lens group and focal lengths of the overall lens system at the wide angle end and telephoto end. If the zoom lens is configured to fall below the lower limit of the conditional expression (2), the correction of spherical aberration near the wide angle end becomes difficult. Contrary to this, if the zoom lens is configured to exceed the upper limit of the conditional expression (2), there arises a problem that the overall lens length is increased, although advantageous for aberration correction.

The zoom lens configured in the manner described above may satisfactorily correct spherical aberration, so that the F-number may be reduced while minimizing spherical aberration.

According to the second zoom lens and image pickup apparatus of the present invention, a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing are disposed in this order from an object side, in which the third lens group is composed of a third group first lens which is a single lens with at least one surface being aspheric and has a positive power and a third group second lens which is a single lens with an image side surface being concave to the image side and has a negative power, disposed in this order from the object side, and when a refractive index of the third group first lens with respect to d-line, a focal length of the fourth lens group, a focal length of the overall lens system at a wide angle end, and a focal length of the overall lens system at a telephoto end are taken as Nd31, f4, fw, and ft respectively, conditional expressions (3): $1.77<Nd31$ and (4): $0.55<f4/(fw \cdot ft)^{1/2}<0.82$ are simultaneously satisfied. This allows downsizing with increased aperture and zoom ratios to be achieved while minimizing aberrations.

Here, the conditional expression (3) specifies the refractive index of the third group first lens. If the zoom lens is configured to fall below the lower limit of the conditional expression (3), the curvature (approximate curvature) of the lens surface of the third group first lens needs to be increased and the correction of aberrations, such as spherical aberration, becomes difficult. Further, if the zoom lens is configured to fall below the lower limit of the conditional expression (3) while trying to correct aberrations satisfactorily, there arises a problem that the overall lens length needs to be increased.

Note that the conditional expression (3) describes the same condition as that of the conditional expression (1) described above.

The conditional expression (4) specifies the relationship between the focal length of the fourth lens group and focal lengths of the overall lens system at the wide angle end and telephoto end. If the zoom lens is configured to fall below the lower limit of the conditional expression (4), it is difficult to obtain satisfactory optical performance at each magnification (over the entire zoom range). Contrary to this, if the zoom lens is configured to exceed the upper limit of the conditional expression (4), there arises a problem that the amount of movement of the fourth lens group is increased at the time of zooming or focusing.

The zoom lens configured in the manner described above may satisfactorily correct spherical aberration, so that the F-number may be reduced while minimizing spherical aberration.

According to the third zoom lens and image pickup apparatus of the present invention, a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing are disposed in this order from an object side, in which the third lens group is composed of a third group first lens which is a single lens with at least one surface being aspheric and has a positive power and a third group second lens which is a single meniscus lens with an image side surface being concave to the image side and has a negative power, disposed in this order from the object side, and the fourth lens group is composed of at lest one lens having a positive power, and in which, when a refractive index of the third group first lens with respect to d-line, an Abbe number of the third group first lens with respect to d-line, a refractive index of the third group second lens with respect to d-line, an Abbe number of the third group second lens with respect to d-line, and a highest Abbe number of those of the positive lenses in the fourth lens group with respect to d-line are taken as Nd31, vd31, Nd32, vd32, and vd4p respectively, conditional expressions (5): $1.72<Nd31$, (6) $36<vd31<52$, (7): $1.80<Nd32$, (8): $16<vd32<27$, and (9): $63<vd4p$ are satisfied. This allows downsizing with increased aperture and zoom ratios to be achieved while minimizing aberrations.

Here, the conditional expression (5) specifies the refractive index of the third group first lens. If the zoom lens is configured to fall below the lower limit of the conditional expression (5), the curvature (approximate curvature) of the lens surface of the third group first lens needs to be increased and the correction of aberrations, such as spherical aberration, becomes difficult. Further, if the zoom lens is configured to fall below the lower limit of the conditional expression (5) while trying to correct aberrations satisfactorily, there arises a problem that the overall lens length needs to be increased.

The conditional expression (6) specifies the Abbe number of the third group first lens. If the zoom lens falls outside the range of the conditional expression (6), there arises a problem that it is difficult to correct chromatic aberration near the wide angel end in a well-balanced manner.

The conditional expression (7) specifies the refractive index of the third group second lens. If the zoom lens falls below the lower limit of the conditional expression (7), the curvature of the image side surface of the third group second lens is increased, thereby causing a problem that the thickness of the overall third lens group is increased.

The conditional expression (8) specifies the Abbe number of the third group second lens. If the zoom lens falls outside the range of the conditional expression (8), there arises a problem that it is difficult to correct axial chromatic aberration in a well-balanced manner.

The conditional expression (9) specifies the highest Abbe number of those of the positive lenses in the fourth lens group with respect to d-line. If the zoom lens falls below the lower limit of the conditional expression (9), there arises a problem that the variation in chromatic aberration at the time of zooming or focusing is increased.

The zoom lens configured in the manner described above may satisfactorily correct spherical aberration, so that the F-number may be reduced while minimizing spherical aberration.

BRIEF DESCRIPTION OF DRAWINGS

FIG. 13 illustrates various types of aberrations of the zoom lens of Example 1.

FIG. 14 illustrates various types of aberrations of the zoom lens of Example 2.

FIG. 15 illustrates various types of aberrations of the zoom lens of Example 3.

FIG. 16 illustrates various types of aberrations of the zoom lens of Example 4.

FIG. 17 illustrates various types of aberrations of the zoom lens of Example 5.

FIG. 18 illustrates various types of aberrations of the zoom lens of Example 6.

FIG. 19 illustrates various types of aberrations of the zoom lens of Example 7.

FIG. 20 illustrates various types of aberrations of the zoom lens of Example 8.

FIG. 21 illustrates various types of aberrations of the zoom lens of Example 9.

FIG. 22 illustrates various types of aberrations of the zoom lens of Example 10.

FIG. 23 illustrates various types of aberrations of the zoom lens of Example 11.

BEST MODE FOR CARRYING OUT THE INVENTION

Figure 1:
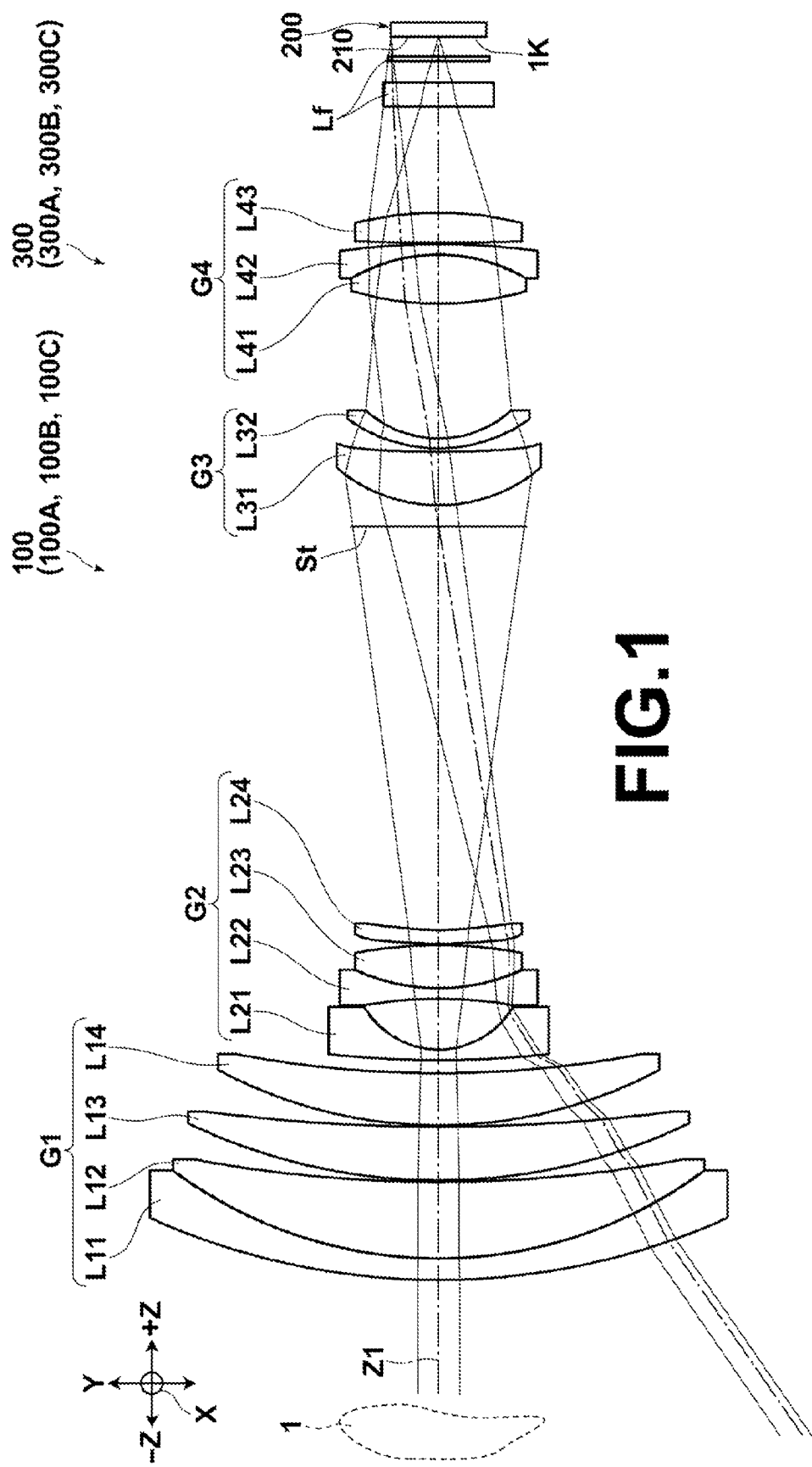
FIG. 1 is a cross-sectional view of an image pickup apparatus equipped with a zoom lens of the present invention, illustrating a schematic configuration thereof.
Figure 2:
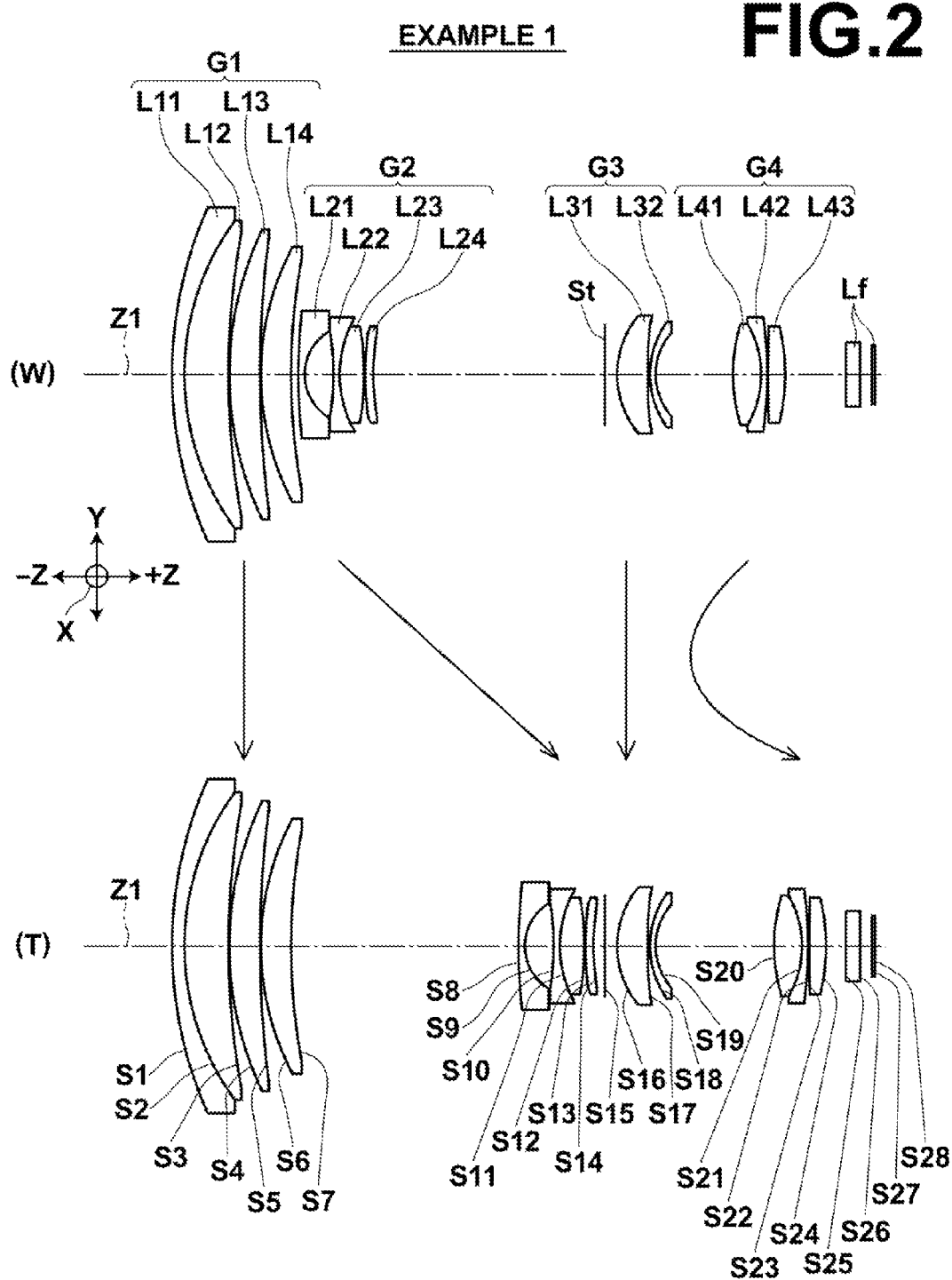
FIG. 2 is a cross-sectional view of a zoom lens of Example 1, comparatively illustrating the state in which the zoom is set to a wide angle end and the state in which it is set to a telephoto end.
Figure 3:
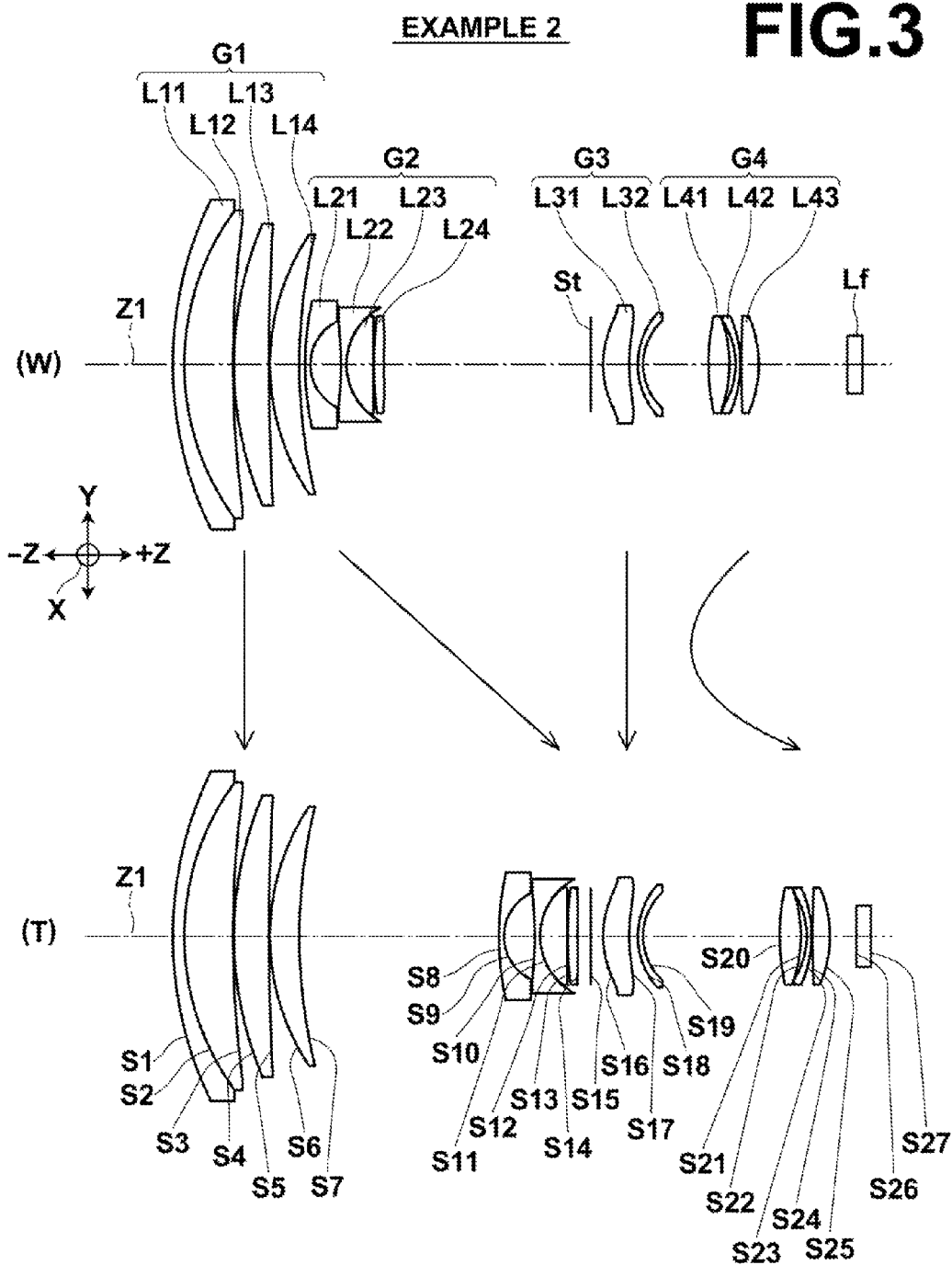
FIG. 3 is a cross-sectional view of a zoom lens of Example 2, comparatively illustrating the state in which the zoom is set to a wide angle end and the state in which it is set to a telephoto end.
Figure 4:
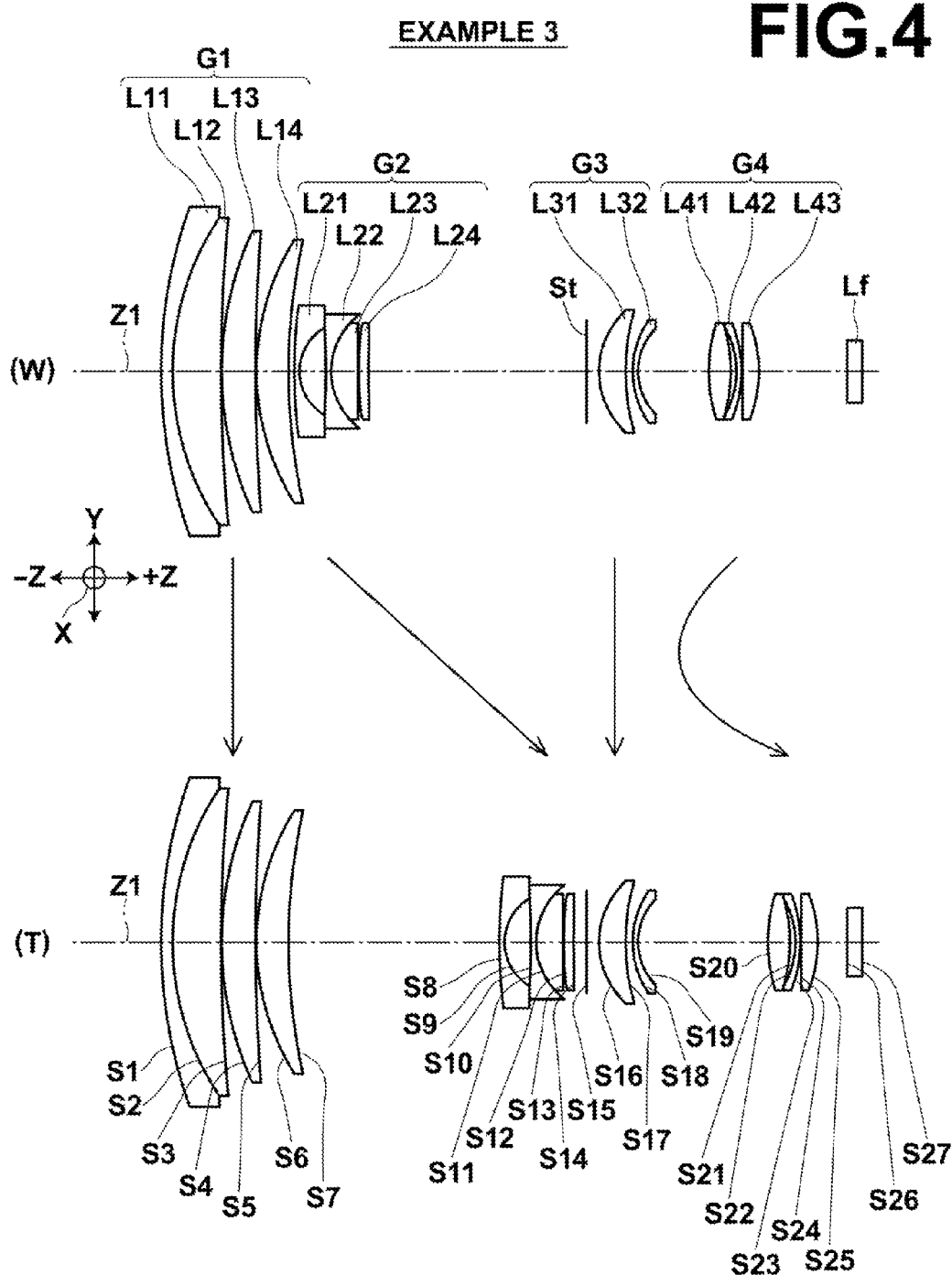
FIG. 4 is a cross-sectional view of a zoom lens of Example 3, comparatively illustrating the state in which the zoom is set to a wide angle end and the state in which it is set to a telephoto end.
Figure 5:
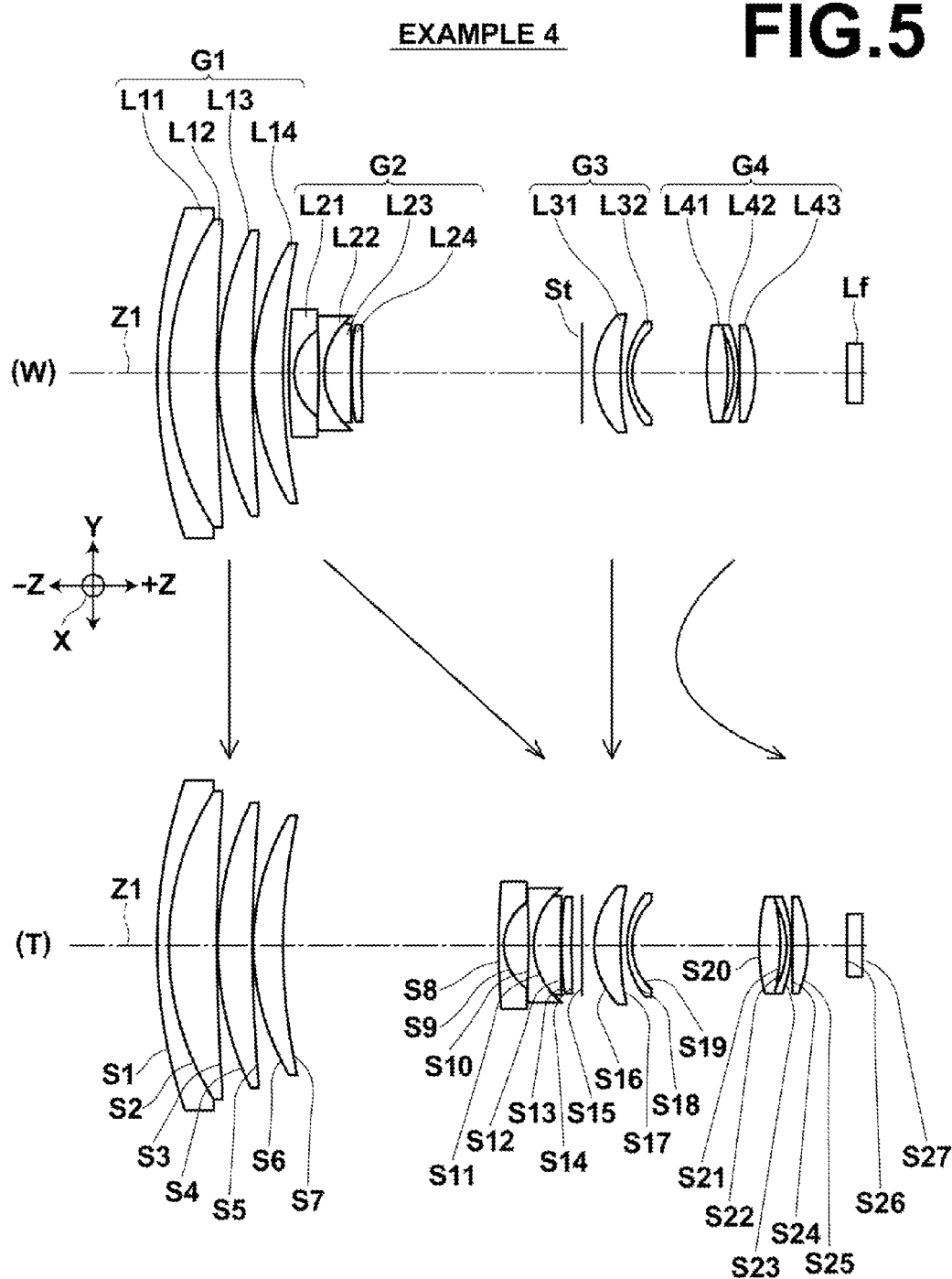
FIG. 5 is a cross-sectional view of a zoom lens of Example 4, comparatively illustrating the state in which the zoom is set to a wide angle end and the state in which it is set to a telephoto end.
Figure 6:
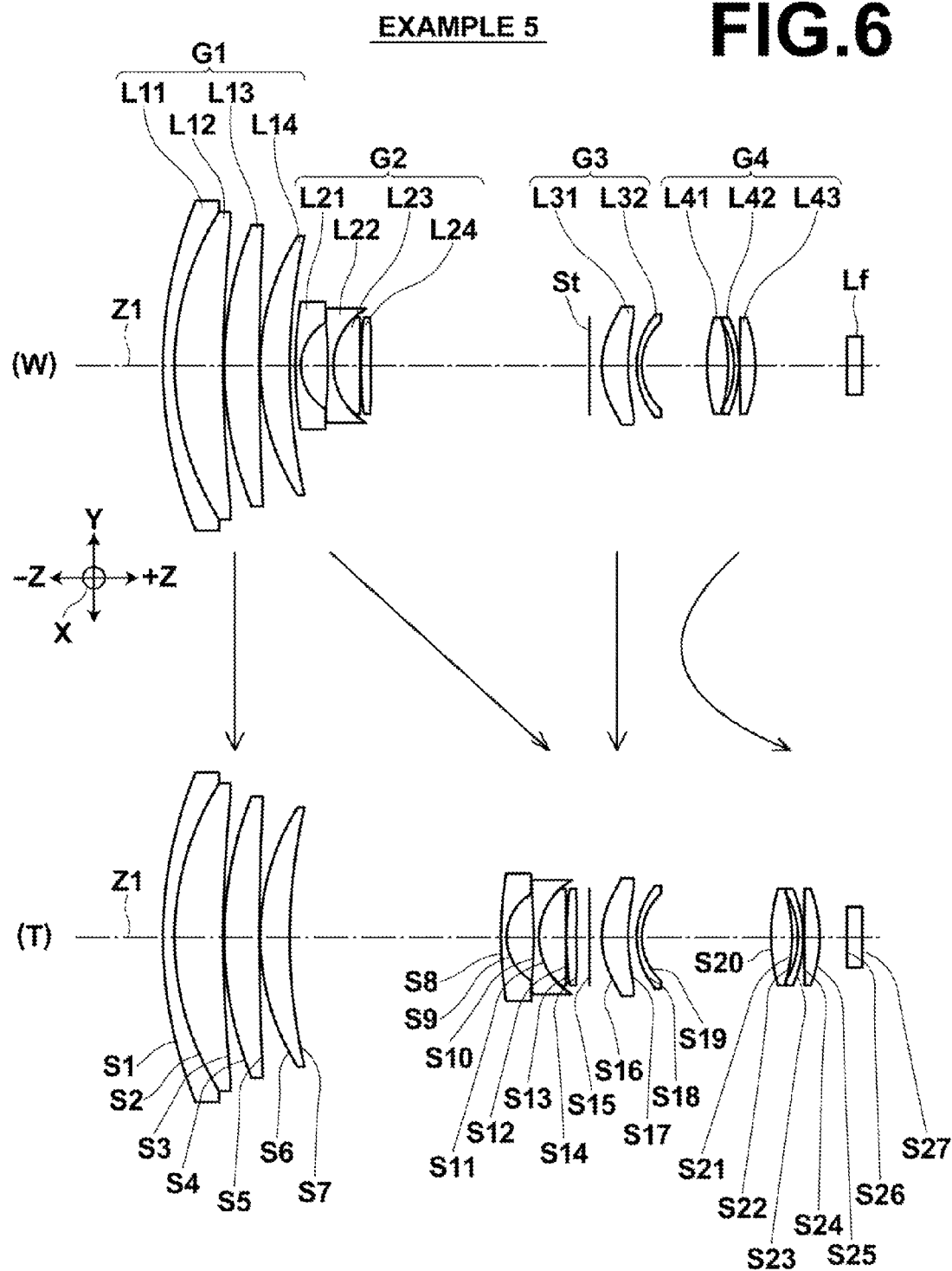
FIG. 6 is a cross-sectional view of a zoom lens of Example 5, comparatively illustrating the state in which the zoom is set to a wide angle end and the state in which it is set to a telephoto end.
Figure 7:
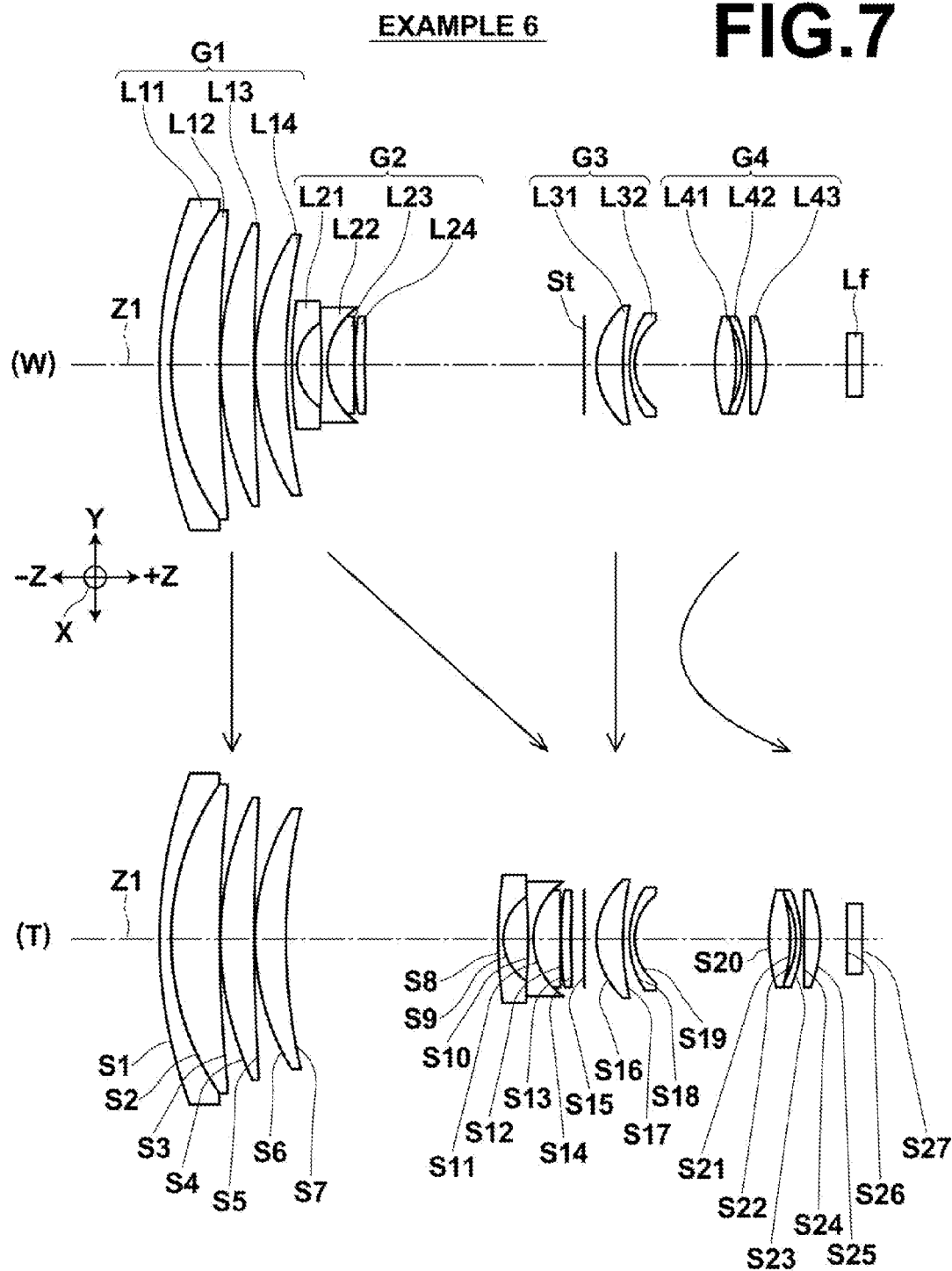
FIG. 7 is a cross-sectional view of a zoom lens of Example 6, comparatively illustrating the state in which the zoom is set to a wide angle end and the state in which it is set to a telephoto end.
Figure 8:
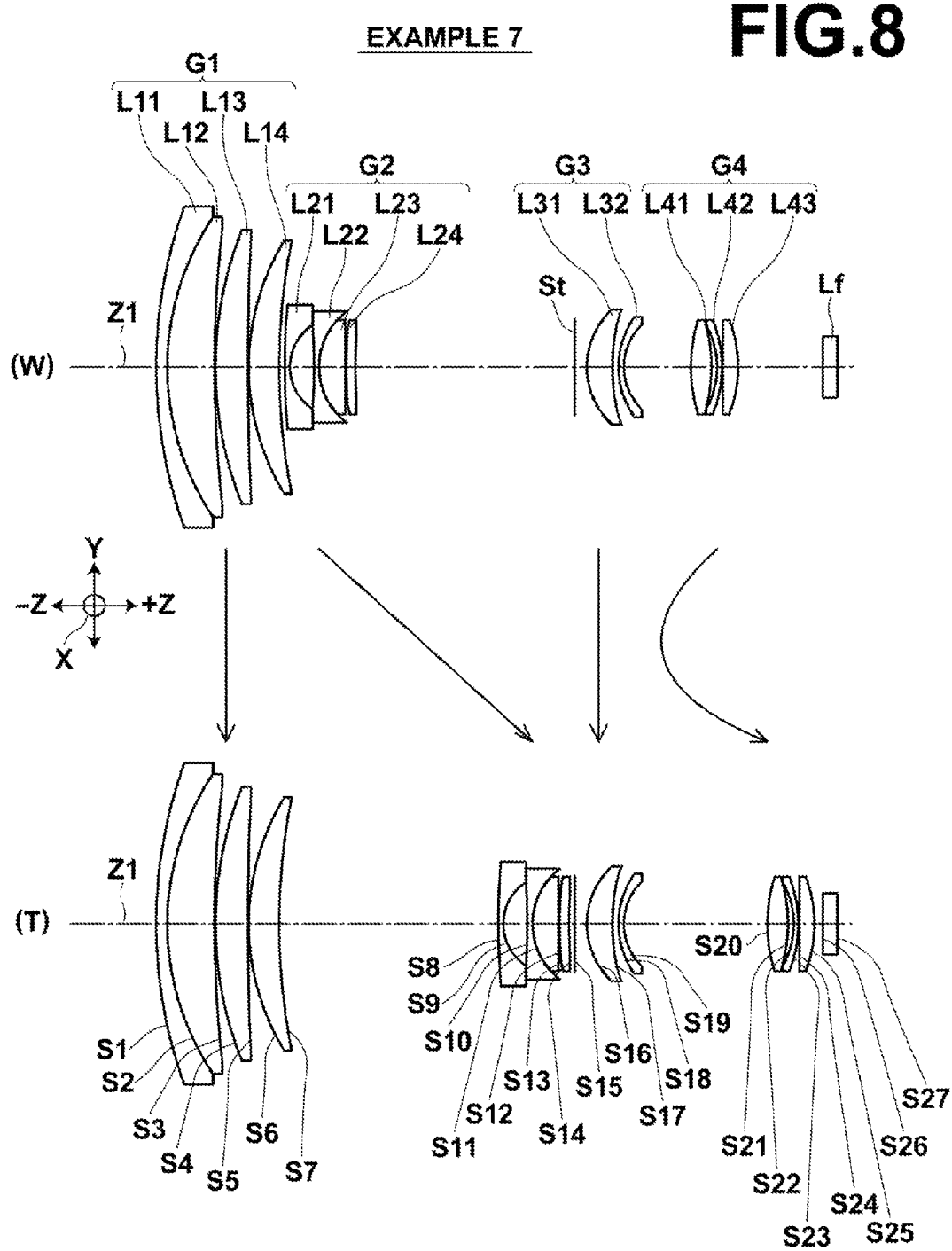
FIG. 8 is a cross-sectional view of a zoom lens of Example 7, comparatively illustrating the state in which the zoom is set to a wide angle end and the state in which it is set to a telephoto end.
Figure 9:
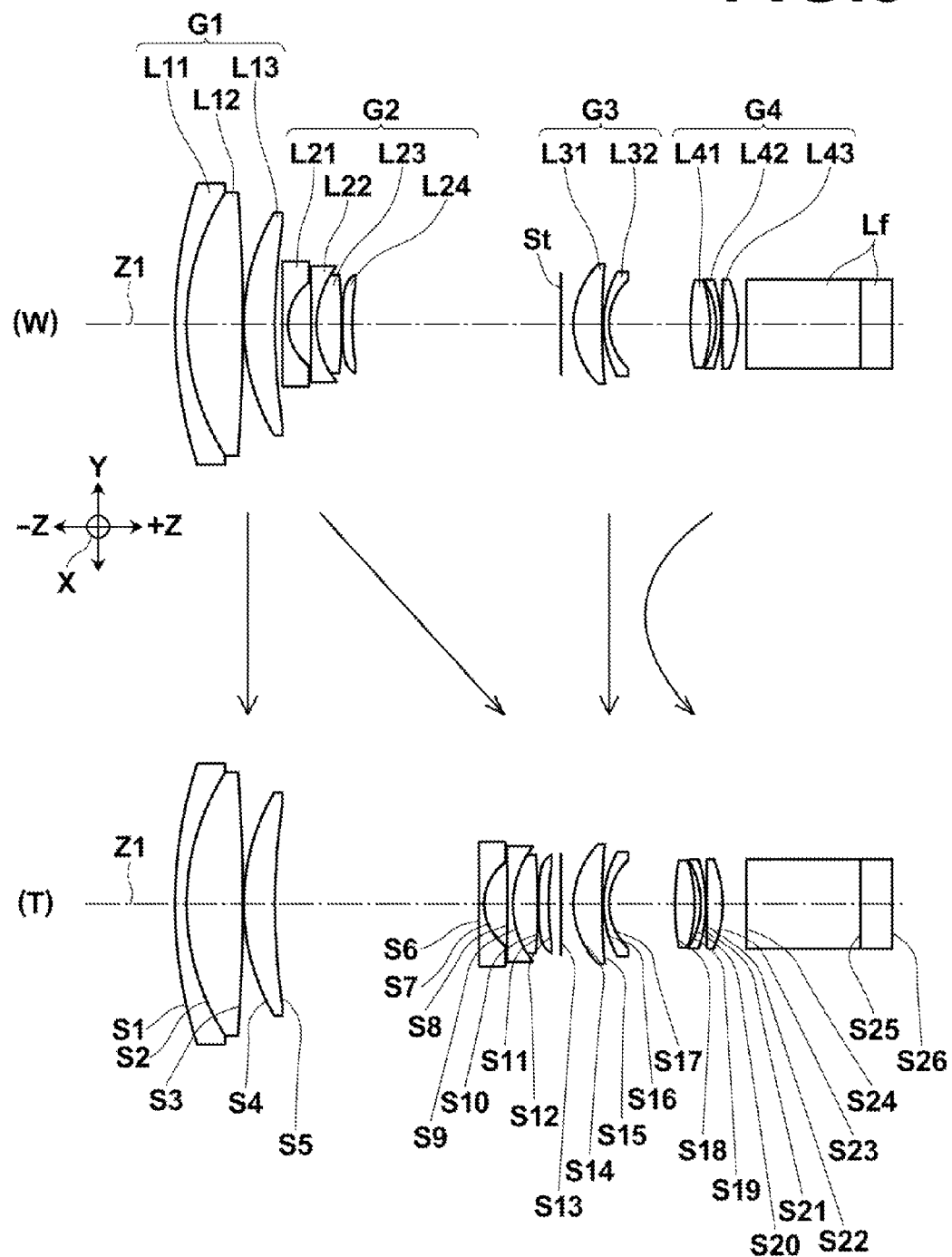
FIG. 9 is a cross-sectional view of a zoom lens of Example 8, comparatively illustrating the state in which the zoom is set to a wide angle end and the state in which it is set to a telephoto end.
Figure 10:
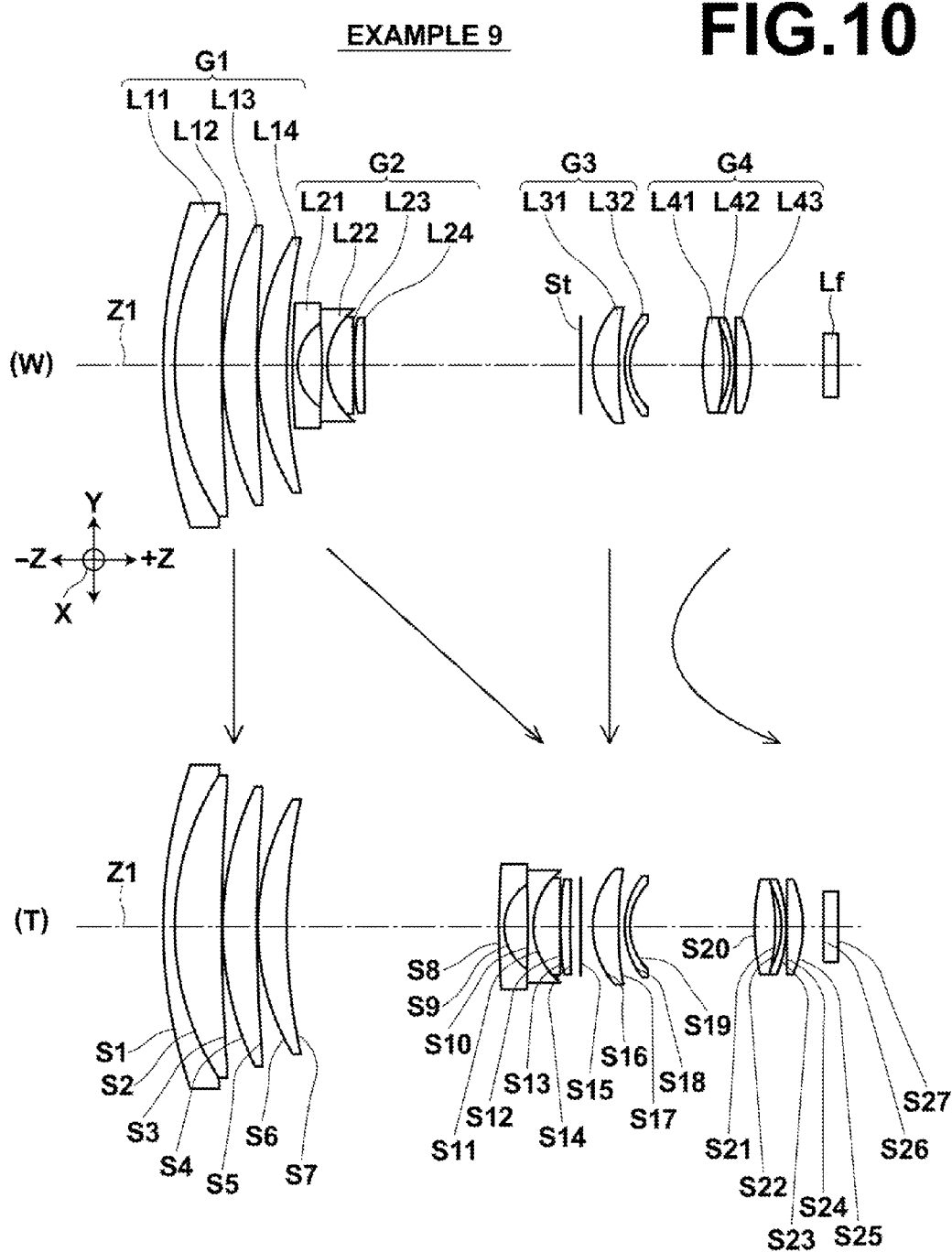
FIG. 10 is a cross-sectional view of a zoom lens of Example 9, comparatively illustrating the state in which the zoom is set to a wide angle end and the state in which it is set to a telephoto end.
Figure 11:
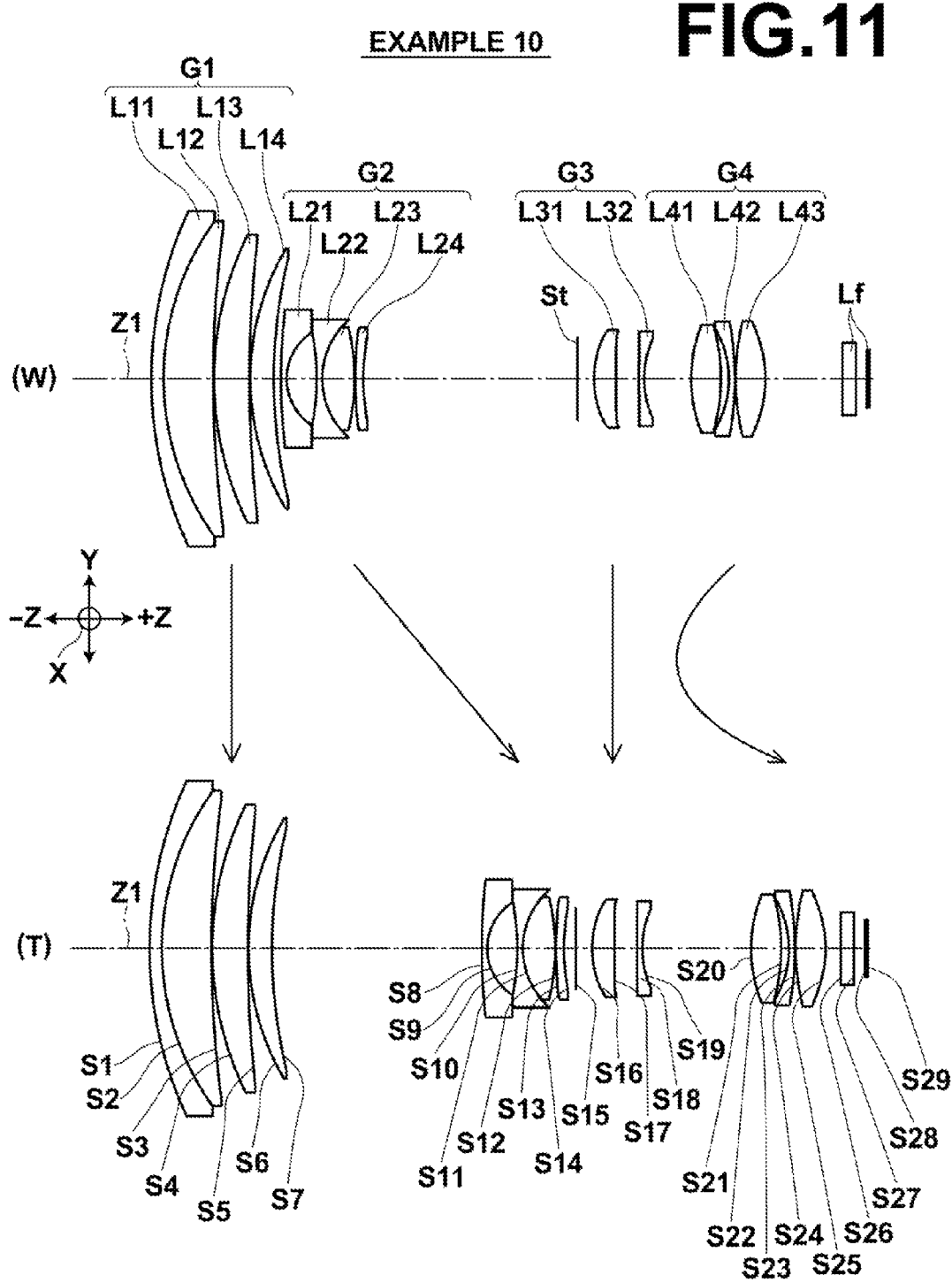
FIG. 11 is a cross-sectional view of a zoom lens of Example 10, comparatively illustrating the state in which the zoom is set to a wide angle end and the state in which it is set to a telephoto end.
Figure 12:
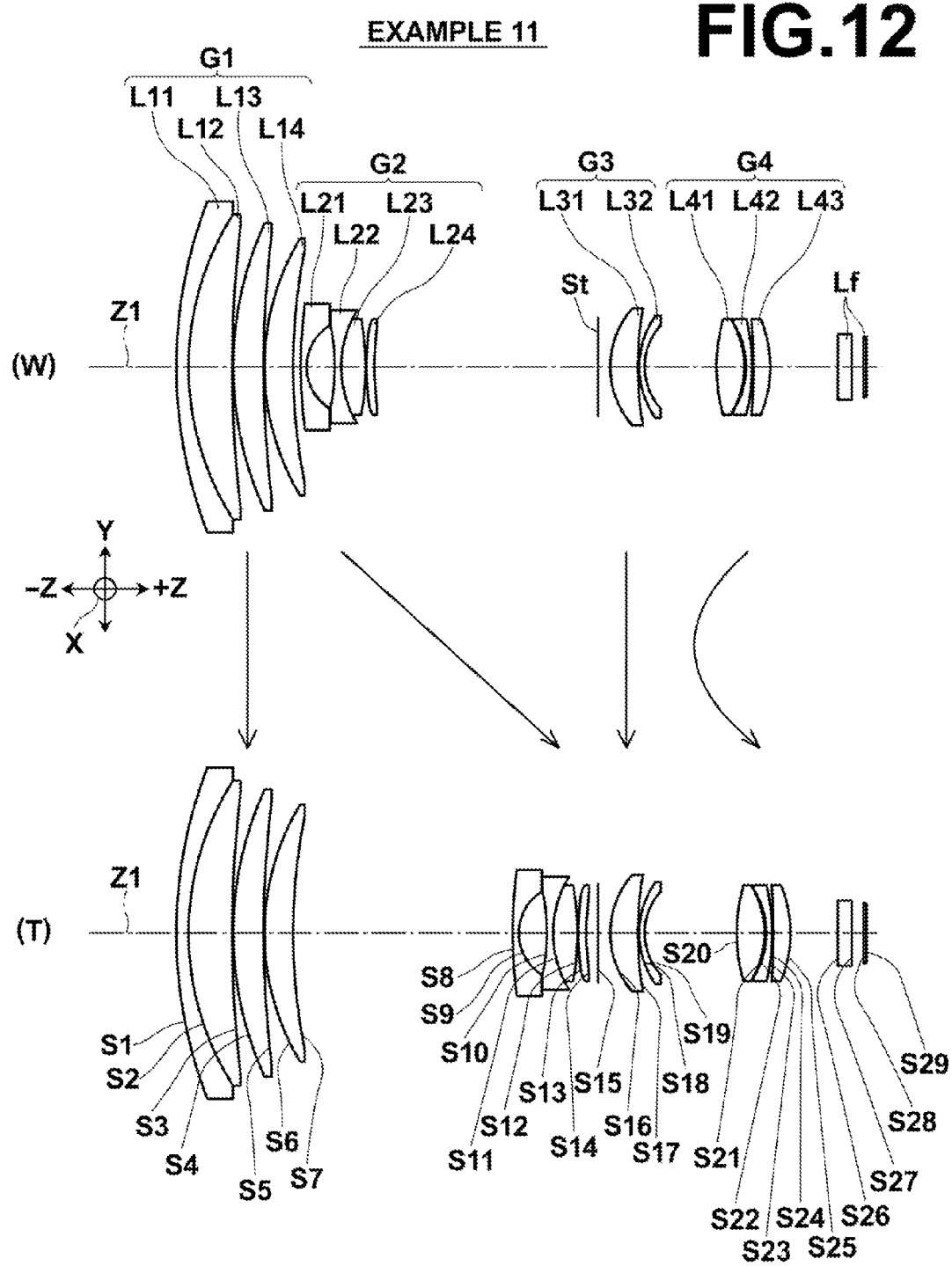
FIG. 12 is a cross-sectional view of a zoom lens of Example 11, comparatively illustrating the state in which the zoom is set to a wide angle end and the state in which it is set to a telephoto end.

Hereinafter, embodiments of the present invention will be described with reference to the accompanying drawings. FIG. 1 is a cross-sectional view of an image pickup apparatus of the present invention equipped with a zoom lens of the present invention, illustrating a schematic configuration thereof. Note that FIG. 1 illustrates an optical path passing the optical axis and an optical path passing outside the optical axis.

FIG. 1 commonly illustrates an image pickup apparatus 300A according to a first embodiment equipped with a zoom lens 100A according to a first embodiment of the present invention, an image pickup apparatus 300B according to a second embodiment equipped with a zoom lens 100B according to a second embodiment of the present invention, and an image pickup apparatus 300C according to a third embodiment equipped with a zoom lens 100C according to a third embodiment of the present invention.

The image pickup apparatus 300A according to the first embodiment of the present invention includes the zoom lens 100A and an image sensor 200 having an imaging plane 210 on which a large number of light receiving pixels are disposed for capturing an optical image 1K of a subject 1 formed through the zoom lens 100A.

The image pickup apparatus 300B according to the second embodiment of the present invention includes the zoom lens 100B and the image sensor 200 having the imaging plane 210 on which a large number of light receiving pixels are disposed for capturing an optical image 1K of a subject 1 formed through the zoom lens 100B.

The image pickup apparatus 300C according to the third embodiment of the present invention includes the zoom lens 100C and the image sensor 200 having the imaging plane 210 on which a large number of light receiving pixels are disposed for capturing an optical image 1K of a subject 1 formed through the zoom lens 100C.

The zoom lens 100A according to the first embodiment, zoom lens 100B according to the second embodiment, and zoom lens 100C according to the third embodiment are different in configuration. In the following description, an embodiment that satisfies all of the configurations according to the first to third embodiments will be described first followed by each individual embodiment.

<Embodiment that Satisfies all of the Configurations of Respective Embodiments>

A zoom lens according to an embodiment that satisfies all of the configurations of the respective embodiments and an image pickup apparatus equipped with the zoom lens will now be described.

The zoom lens that satisfies all of the configurations of the zoom lenses 100A, 100B, and 100C according to the first to third embodiments of the present invention is referred to as the "zoom lens 100". In addition, the image pickup apparatus that satisfies all of the configurations of the image pickup apparatuses 300A, 300B, and 300C according to the first to third embodiments is referred to as the "image pickup apparatus 300".

Note that FIG. 1 also illustrates the zoom lens 100 in addition to zoom lenses 100A, 100B, and 100C. FIG. 1 also illustrates the image pickup apparatus 300 in addition to image pickup apparatuses 300A, 300B, and 300C.

The image pickup apparatus 300 shown in FIG. 1 includes the zoom lens 100 and the image sensor 200 having the imaging plane 210 on which a large number of light receiving pixels are disposed for capturing the optical image 1K of the subject 1 formed on the imaging plane 210 through the zoom lens 100.

The zoom lens 100 includes a first lens group G1 which has a positive power and is fixed at the time of zooming, a second lens group G2 which has a negative power and is moved along an optical axis Z1 at the time of zooming, aperture stop St, a third lens group G3 which has a positive power and is fixed at the time of zooming, and a fourth lens group G4 which is moved along the optical axis Z1 at the time of zooming to correct a change in image plane position arising from the zooming for focusing, disposed in this order from the object side.

The zoom lens 100 may further include a filter Lf. The filter Lf is a parallel plate filter for blocking unnecessary light to be incident on the imaging plane 210, and a filter having a function of low-pass filter or of infrared light cut filter may be employed.

The first lens group G1 is composed of a first group first lens L11 having a negative power, a first group second lens L12 having a positive power, a first group third lens L13 having a positive power, and a first group fourth lens L14 having a positive power, disposed in this order from the object side.

The third lens group G3 is composed of a third group first lens L31 which is a single lens with at least one surface being aspheric and has a positive power and a third group second lend L32 which is a meniscus single lens with a convex surface on the image side and has a negative power, disposed in this order from the object side.

The fourth lens group G4 is composed of a fourth group first lens L41 having a positive power, a fourth group second lens L42 having a negative power, a fourth group third lens L43 having a positive power disposed in this order from the object side. Each lens in the fourth lens group G4 is a double-sided spherical single lens.

Further, the zoom lens 100 simultaneously satisfies conditional expressions (A1), (A2), (B1), (B2), (C1), (C2), and (D) to (M).

The conditional expression (A1): $1.77 < Nd31$ corresponds to the conditional expressions (1) and (3) described above.

The conditional expression (A1) specifies a narrower range than that of the conditional expression (A2): $1.72 < Nd31$ corresponding to the conditional expression (5) described above.

The conditional expression (B1): $0.8 < f3/(fw \cdot ft)^{1/2} < 1.6$ corresponds to the conditional expression (2) described above.

The conditional expression (B1) specifies a narrower range than that of the conditional expression (B2): $0.8 < f3/(fw \cdot ft)^{1/2} < 2.3$ corresponding to the conditional expression (11) described above.

The conditional expression (C1): $0.55 < f4/(fw \cdot ft)^{1/2} < 0.82$ corresponds to the conditional expression (4) described above.

The conditional expression (C1) specifies a narrower range than that of the conditional expression (C2): $0.50 < f4/(fw \cdot ft)^{1/2} < 1.2$ corresponding to the conditional expression (10) described above.

The conditional expression (D): $36 < vd31 < 52$ corresponds to the conditional expressions (6) and (12) described above.

The conditional expression (E): $1.80 < Nd32$ corresponds to the conditional expressions (7) and (13) described above.

The conditional expression (F): $16 < vd32 < 27$ corresponds to the conditional expressions (8) and (14) described above.

The conditional expression (G): $63 < vd4p$ corresponds to the conditional expressions (9) and (15) described above.

The conditional expression (H): $0.9 < f3/f4 < 2.5$ corresponds to the conditional expression (16) described above.

The conditional expression (I): $3.2 < (R32f+R32r)/(R32f-R32r) < 8.0$ corresponds to the conditional expression (17) described above. The conditional expression (J): $0.62 < TL/ft < 1.10$ corresponds to the conditional expression (18) described above.

The conditional expression (K): $-6.0 < (R42f+R42r)/(R42f-R42r) < -1.3$ corresponds to the conditional expression (19) described above.

The conditional expression (L) $0.25 < f1/ft < 0.50$ corresponds to the conditional expression (20) described above.

The conditional expression (M) $0.25 < |f2|/(fw \cdot ft)^{1/2} 0.45$ corresponds to the conditional expression (21) described above.

Each symbol in the conditional expressions (A1) to (M) has the following meaning:

Nd31: a refractive index of the third group first lens with respect to d-line;

f3: a focal length of the third lens group;

fw: a focal length of the overall lens system at a wide angle end;

ft: a focal length of the overall lens system at a telephoto end;

f4: a focal length of the fourth lens group;

vd31: an Abbe number of the third group first lens with respect to d-line;

Nd32: a refractive index of the third group second lens with respect to d-line;

vd32: an Abbe number of the third group second lens with respect to d-line;

vd4p: a highest Abbe number of those of the positive lenses in the fourth lens group with respect to d-line;

R32f: a radius of curvature of an object side surface of the third group second lens;

R32r: a radius of curvature of an image side surface of the third group second lens;

TL: a distance from a most object side lens surface in the first lens group to an image forming plane on the optical axis;

R42f: a radius of curvature of an object side surface of the fourth group second lens;

R42r: a radius of curvature of an image side surface of the fourth group second lens;

f1: a focal length of the first lens group; and f2: a focal length of the second lens group.

The overall optical length TL which is the "distance from the object side surface of the first group first lens to the image forming plane on the optical axis" corresponds to the distance from the object side surface of the first group first lens L11 to the image forming plane (imaging plane 210) on the optical axis Z1. Note that the distance described above is an actual distance (real distance), not an air equivalent distance.

The conditional expression (A1): $1.77<N31$ described above specifies the refractive index of the third group first lens L31.

If the zoom lens 100 is configured to fall below the lower limit of the conditional expression (A1), the curvature (approximate curvature) of the lens surface of the third group first lens L31 needs to be increased and the correction of aberrations, such as spherical aberration, becomes difficult. If the zoom lens 100 is configured to fall below the lower limit of the conditional expression (A1) while trying to correct aberrations satisfactorily, there arises a problem that the overall lens length needs to be increased.

Preferably, the conditional expression (A1) is restricted to the range of conditional expression (A1'): $1.74<Nd31$.

The conditional expression (B1): $0.8<f3/(fw \cdot ft)^{1/2}<1.6$ described above specifies the relationship between the focal length of the third lens group G3 and focal lengths of the overall lens system at the wide angle end and telephoto end.

If the zoom lens 100 is configured to fall below the lower limit of the conditional expression (B1), the correction of spherical aberration near the wide angle end becomes difficult, although advantageous for downsizing.

Contrary to this, if the zoom lens 100 is configured to exceed the upper limit of the conditional expression (B1), there arises a problem that the overall lens length is increased, although advantageous for aberration correction.

Preferably, the conditional expression (B1) is restricted to the range of conditional expression (B1') $0.90<f3/(fw \cdot ft)^{1/2}<1.55$.

The conditional expression (C1): $0.55<f4/(fw \cdot ft)^{1/2}<0.82$ described above specifies the relationship between the focal length of the fourth lens group G4 and focal lengths of the overall lens system at the wide angle end and telephoto end.

If the zoom lens 100 is configured to fall below the lower limit of the conditional expression (C1), there arises a problem that it is difficult to obtain satisfactory optical performance at each magnification (over the entire zoom range).

Contrary to this, if the zoom lens 100 is configured to exceed the upper limit of the conditional expression (C1), there arises a problem that the amount of movement of the fourth lens group G4 is increased at the time of zooming or focusing.

Preferably, the conditional expression is restricted to the range of conditional expression (C1'): $0.57<f4/(fw \cdot ft)^{1/2}<0.80$.

The conditional expression (D): $36<vd31<52$ described above specifies the Abbe number of the third group first lens L31.

If the zoom lens 100 is configured to fall outside the range of the conditional expression (D), there arises a problem that it is difficult to correct chromatic aberration near the wide angle end in a well-balanced manner.

Preferably, the conditional expression (D) is restricted to the range of conditional expression (D'): $38<vd31<50$.

The conditional expression (E): $1.80<Nd32$ described above specifies the refractive index of the third group second lens 132.

If the zoom lens is configured to fall below the lower limit of the conditional expression (E), the curvature of the image side lens of the third group second lens is increased, thereby causing a problem that the thickness of the overall third lens group G3 is increased.

Preferably, the conditional expression (E) is restricted to the range of conditional expression (E'): $1.84<Nd32$.

The conditional expression (F): $16<vd32<27$ described above specifies the Abbe number of the third group second lens L32.

If the zoom lens 100 is configured to fall outside the range of the conditional expression (F), there arises a problem that it is difficult to correct axial chromatic aberration in a well-balanced manner.

Preferably, the conditional expression (F) is restricted to the range of conditional expression (F') $17<vd32<26$.

The conditional expression (G): $63<vd4p$ described above specifies the highest Abbe number of those of the positive lenses in the fourth lens group.

If the zoom lens 100 is configured to fall below the lower limit of the conditional expression (G), there arises a problem that the variation in chromatic aberration at the time of zooming or focusing is increased.

Preferably, the conditional expression (G) is restricted to the range of conditional expression (G') $65<vd4p$.

The conditional expression (H) $0.9<f3/f4<2.5$ described above specifies the ratio between the focal length of the third lens group G3 and the focal length of the fourth lens group G4.

If the zoom lens 100 is configured to fall below the lower limit of the conditional expression (H), the power of the third lens group G3 becomes strong, thereby causing a problem that it is difficult to satisfactorily correct spherical aberration over the entire zoom range.

Contrary to this, if the zoom lens 100 is configured to exceed the upper limit of the conditional expression (H), the power of the fourth lens group G4 becomes strong, thereby causing a problem that the variation in aberration at the time of zooming or focusing is increased. Further, the light incident height on the fourth lens group G4 is increased, thereby causing a problem that the size of the fourth lens group G4 is increased.

Preferably, the conditional expression (H) is restricted to the range of conditional expression (H') $1.0<f3/f4<2.4$.

The conditional expression (I): $3.2<(R32f+R32r)/(R32f-R32r)<8.0$ specifies the shape factor of the third group second lens.

If the zoom lens 100 is configured to satisfy the conditional expression (I), chromatic aberration may be corrected in a well-balanced manner.

If the zoom lens 100 is configured to fall outside the range of the conditional expression (I), there arises a problem that it is difficult to correction axial chromatic dispersion or to correct spherical aberration over the entire zoom region in a well-balanced manner.

In particular, if the zoom lens 100 is configured to fall below the lower limit of the conditional expression (I), there arises a problem that short wavelength chromatic aberration is increased, while if the zoom lens 100 is configured to exceed the upper limit of the conditional expression (I), there arises a problem that long wavelength chromatic aberration is increased.

Preferably, the conditional expression (I) is restricted to the range of conditional expression (I'): $3.4 < (R32f+R32r)/(R32f-R32r) < 7.8$.

The conditional expression (J) $0.62 < TL/ft < 1.10$ specifies the relationship between the overall optical length and focal length of the overall lens system at the telephoto end.

If the zoom lens 100 is configured to fall below the lower limit of the conditional expression (J) for downsizing, the correction of field curvature becomes difficult. Further, the power of each lens becomes too strong and becomes sensitive (sensitivity is increased) to the performance degradation due to manufacturing error or assembly error, thereby causing a problem of very high level of difficulty in manufacturing. Still further, this also causes a problem that the variation in aberration at the time of zooming or focusing is increased.

Contrary to this, if the zoom lens 100 is configured to exceed the upper limit of the conditional expression (J), there arises a problem that the size of the overall lens system is increased, although advantageous for aberration correction.

Preferably, the conditional expression (J) is restricted to the range of conditional expression (J') $0.63 < TL/ft < 1.05$. The conditional expression (K): $-6.0 < (R42f+R42r)/(R42f-R42r) < -1.3$ specifies the shape factor of the fourth group second lens L42.

If the zoom lens 100 is configured to fall outside the range of the conditional expression (K), there arises a problem that it is difficult to correct lateral chromatic aberration over the entire zoom range in a well-balanced manner.

Preferably, the conditional expression (K) is restricted to the range of conditional expression (K'): $-5.8 < (R42f+R42r)/(R42f-R42r) < -1.4$.

The conditional expression (L): $0.25 < f1/ft < 0.50$ specifies the relationship between the focal length of the first lens group G1 and focal length of the overall lens system at the telephoto end.

If the zoom lens 100 is configured to fall below the lower limit of the conditional expression (L), an excessive burden falls on the first lens group G1, thereby causing a problem that the correction of chromatic aberration and spherical aberration near the telephoto end becomes difficult, though it is advantageous for downsizing.

Contrary to this, if the zoom lens 100 is configured to exceed the upper limit of the conditional expression (L), there arises a problem that the overall lens length is increased.

Preferably, the conditional expression (L) is restricted to the range of conditional expression (L'): $0.28 < f1/ft < 0.45$.

The conditional expression (M): $0.25 < |f2|/(fw \cdot ft)^{1/2} < 0.45$ specifies the relationship between the focal length of the second lens group G2 and focal lengths of the overall lens system at the wide angle end and telephoto end. If the zoom lens 100 is configured to fall below the lower limit of the conditional expression (M), the power of the second lens group G2 becomes strong and the amount of movement of the second lens group G2 may be reduced, but there arises a problem that the correction of field curvature becomes difficult.

Contrary to this, if the zoom lens 100 is configured to exceed the upper limit of the conditional expression (M), there arises a problem that the overall lens length is increased.

Preferably, the conditional expression (M) is restricted to the range of conditional expression (M'): $0.26 < |f2|/(fw \cdot ft) < 0.43$.

<Individual Configurations of Respective Embodiments 1 to 3>

Hereinafter, the configuration of each embodiment will be described separately.

The configuration of the zoom lens 100A of the first embodiment of the present invention will be described first.

The zoom lens 100A includes a first lens group G1 which has a positive power and is fixed at the time of zooming, a second lens group G2 which has a negative power and is moved along an optical axis Z1 at the time of zooming, an aperture stop St, a third lens group G3 which has a positive power and is fixed at the time of zooming, and a fourth lens group G4 which is moved along the optical axis Z1 at the time of zooming to correct a change in image plane position arising from the zooming for focusing, disposed in this order from the object side.

The third lens group G3 of the zoom lens 100A is composed of a third group first lens L31 which is a single lens with at least one surface being aspheric and has a positive power and a third group second lens L32 which is a single lens with an image side surface being concave to the image side and has a negative power, and simultaneously satisfies the conditional expression (A1) and conditional expression (B1) described above.

The configuration described above is the essential configuration of the zoom lens 100A.

A desirable configuration of the zoom lens 100A will now be described.

Preferably, the zoom lens 100A satisfies the conditional expression (B1') described above.

Preferably, the zoom lens 100A satisfies the conditional expression (C2): $0.50 < f4/(fw \cdot ft)^{1/2} < 1.2$ described above and more preferably the conditional expression (C2') $0.57 < f4/(fw \cdot ft)^{1/2} < 1.15$ described above.

Preferably, the zoom lens 100A satisfies the conditional expression (D) described above and more preferably the conditional expression (D') described above.

Preferably, the zoom lens 100A simultaneously satisfies the conditional expressions (E) and (F) described above, and more preferably the conditional expressions (E') and (F') described above.

Preferably, the zoom lens 100A satisfies the conditional expression (G) described above and more preferably the conditional expression (G') described above.

Preferably, the zoom lens 100A satisfies the conditional expression (H) described above and more preferably the conditional expression (H') described above.

Preferably, the zoom lens 100A satisfies the conditional expression (I) described above and more preferably the conditional expression (I') described above.

Preferably, the zoom lens 100A satisfies the conditional expression (J) described above and more preferably the conditional expression (J') described above.

Preferably, the fourth lens group G4 is composed of a fourth group first lens L41 having a positive power, a fourth group second lens L42 having a negative power, and a fourth group third lens L43 having a positive power, disposed in this order from the object side.

Preferably, the zoom lens 100A satisfies the conditional expression (K) described above and more preferably the conditional expression)(K') described above.

Preferably, each lens in the fourth lens group G4 is a double-sided spherical single lens.

Preferably, the first lens group G1 is composed of a first group first lens L11 having a negative power, a first group second lens L12 having a positive power, a first group third lens L13 having a positive power, and a first group fourth lens L14 having a positive power, disposed in this order from the object side.

Preferably, the zoom lens 100A satisfies the conditional expression (L) described above and more preferably the conditional expression (L') described above.

Preferably, the zoom lens 100A satisfies the conditional expression (M) described above and more preferably the conditional expression (M') described above.

Next, an individual configuration of the zoom lens 1005 of the second embodiment will be described.

The zoom lens 100B includes a first lens group G1 which has a positive power and is fixed at the time of zooming, a second lens group G2 which has a negative power and is moved along an optical axis Z1 at the time of zooming, an aperture stop St, a third lens group G3 which has a positive power and is fixed at the time of zooming, and a fourth lens group G4 which is moved along the optical axis Z1 at the time of zooming to correct a change in image plane position arising from the zooming for focusing, disposed in this order from the object side.

The third lens group G3 of the zoom lens 100B is composed of a third group first lens L31 which is a single lens with at least one surface being aspheric and has a positive power and a third group second lens L32 which is a single lens with an image side surface being concave to the image side and has a negative power, and simultaneously satisfies the conditional expression (A1) and conditional expression (C1) described above.

The configuration described above is the essential configuration of the zoom lens 100B.

A desirable configuration of the zoom lens 100B will now be described.

Preferably, the zoom lens 100B satisfies the conditional expression (C1') described above.

Preferably, the zoom lens 100B satisfies the conditional expression (B2): $0.80<f3/(fw \cdot ft)^{1/2}<2.3$ described above and more preferably a conditional expression (B2') $0.90<f3/(fw \cdot ft)^{1/2}<2.25$.

Preferably, the zoom lens 100B satisfies the conditional expression (D) described above and more preferably the conditional expression (D') described above.

Preferably, the zoom lens 100B simultaneously satisfies the conditional expressions (E) and (F) described above and more preferably the conditional expressions (E') and (F') described above Preferably, the zoom lens 100B satisfies the conditional expression (G) described above and more preferably the conditional expression (G') described above.

Preferably, the zoom lens 100B satisfies the conditional expression (H) described above and more preferably the conditional expression (H') described above.

Preferably, the zoom lens 100B satisfies the conditional expression (I) described above and more preferably the conditional expression (I') described above.

Preferably, the zoom lens 1003 satisfies the conditional expression (J) described above and more preferably the conditional expression (J') described above.

Preferably, the fourth lens group G4 is composed of a fourth group first lens L41 having a positive power, a fourth group second lens L42 having a negative power, and a fourth group third lens L43 having a positive power, disposed in this order from the object side.

Preferably, the zoom lens 1003 satisfies the conditional expression (K) described above and more preferably the conditional expression (K') described above.

Preferably, each lens in the fourth lens group G4 is a double-sided spherical single lens.

Preferably, the first lens group G1 is composed of a first group first lens L11 having a negative power, a first group second lens L12 having a positive power, a first group third lens L13 having a positive power, and a first group fourth lens L14 having a positive power, disposed in this order from the object side.

Preferably, the zoom lens 1003 satisfies the conditional expression (L) described above and more preferably the conditional expression (L') described above.

Preferably, the zoom lens 100B satisfies the conditional expression (M) described above and more preferably the conditional expression (M') described above.

Next, an individual configuration of the zoom lens 100C of the third embodiment will be described.

The zoom lens 100C includes a first lens group G1 which has a positive power and is fixed at the time of zooming, a second lens group G2 which has a negative power and is moved along an optical axis Z1 at the time of zooming, an aperture stop St, a third lens group G3 which has a positive power and is fixed at the time of zooming, and a fourth lens group G4 which is moved along the optical axis Z1 at the time of zooming to correct a change in image plane position arising from the zooming for focusing, disposed in this order from the object side.

The third lens group G3 of the zoom lens 100C is composed of a third group first lens L31 which is a single lens with at least one surface being aspheric and has a positive power and a third group second lens L32 which is a single meniscus lens with a concave surface on the image side and has a negative power, and simultaneously satisfies the conditional expressions (A2): $1.72<Nd31$, (D), (E), (F), and (G) described above.

The configuration described above is the essential configuration of the zoom lens 100C.

A desirable configuration of the zoom lens 100C will now be described.

Preferably, the zoom lens 100C satisfies a conditional expression (A2'): $1.74<Nd31$.

Preferably, the zoom lens 100C satisfies the conditional expression (C2) described above and more preferably the conditional expression (C2') described above.

Preferably, the zoom lens 100C satisfies the conditional expression (B2) described above and more preferably the conditional expression (B2') described above.

Preferably, the zoom lens 100C satisfies the conditional expression (H) described above and more preferably the conditional expression (H') described above.

Preferably, the zoom lens 100C satisfies the conditional expression (I) described above and more preferably the conditional expression (I') described above.

Preferably, the zoom lens 100C satisfies the conditional expression (J) described above and more preferably the conditional expression (J') described above.

Preferably, the fourth lens group G4 is composed of a fourth group first lens L41 having a positive power, a fourth group second lens L42 having a negative power, and a fourth group third lens L43 having a positive power, disposed in this order from the object side.

Preferably, the zoom lens 100C satisfies the conditional expression (K) described above and more preferably the conditional expression (K') described above.

Preferably, each lens in the fourth lens group G4 is a double-sided spherical single lens.

Preferably, the first lens group G1 is composed of a first group first lens L11 having a negative power, a first group second lens L12 having a positive power, a first group third lens L13 having a positive power, and a first group fourth lens L14 having a positive power, disposed in this order from the object side.

Preferably, the zoom lens 100C satisfies the conditional expression (L) described above and more preferably the conditional expression (L') described above.

Preferably, the zoom lens 100C satisfies the conditional expression (M) described above and more preferably the conditional expression (M') described above.

SPECIFIC EXAMPLES

Hereinafter, numerical data and the like of Examples 1 to 11 of the zoom lens according to the present invention will be described with reference to FIGS. 2 to 23 and Tables 1 to 12.

FIGS. 2 to 12 are cross-sectional views of zoom lenses of Examples 1 to 11, illustrating schematic configurations thereof. Each drawing comparatively illustrates the state in which the zoom is set to a wide angle end and the state in which it is set to a telephoto end.

The drawing indicated by the symbol (W) on the upper side of each of FIGS. 2 to 12 represents the state in which the zoom is set to the wide angle end while the drawing indicated by the symbol (T) on the lower side of each of FIGS. 2 to 12 represents the state in which the zoom is set to the telephoto end.

Symbols in FIGS. 2 to 12 corresponding to those in FIG. 1 illustrating the zoom lens 100 represent the corresponding elements.

Examples that satisfy the essential configuration of the zoom lens 100A of the first embodiment are Examples 1 to 8 and Examples 10 to 11, i.e., Examples 1 to 11 except for Example 9.

Examples that satisfy the essential configuration of the zoom lens 100B of the second embodiment are Examples 2 to 7 and Examples 9, 10, i.e., Examples 1 to 11 except for Examples 1, 8, and 11.

Examples that satisfy the essential configuration of the zoom lens 100C of the third embodiment are Examples 1 to 11 (all Examples).

The symbols L11, L12, - - - are those that indicate lenses in each lens group and correspond to the order of lenses arranged from the object side.

Tables 1 to 11 illustrate basic data of zoom lenses of Examples 1 to 11. In each of Tables 1 to 11, lens data are shown on the upper left (indicated by the symbol (a) in the drawing) while each coefficient of the aspheric surface expression representing the lens surface shape (aspheric surface shape) is shown on the upper right (indicated by the symbol (b) in the drawing). Further, in each of Tables 1 to 11, various values with respect to zoom at the wide angle end and telephoto end are shown, in which f is the focal length (in mm) of the overall lens system; Fno. is the value of F number; 2ω is the value of total field angle; and D7, D14, D19, D25, and the like are values of the surface distance between each lens group.

Note that a numerical value or a symbol Dn (n is a numerical value) appears in the column of the surface distance Di (i=1, 2, 3, - - - ) in lens data indicated by the symbol (a) in each drawing and a place where the symbol Dn appears corresponds to the surface distance (air space) between lens groups and the surface distance (air space) varies with the zoom magnification setting.

In the lens data indicated by the symbol (a) in each drawing, the surface number of the optical member, such as a lens or the like, is represented by the symbol i (i=1, 2, 3, - - - ) which is sequentially increased from the object side toward the image side. Note that the lens data include the surface number of the aperture stop St (i=15 or 13) and the surface numbers of the object side surface and image side surface of the parallel plate filter Lf. There may be a case in which the plane parallel plate filter Lf is formed of one parallel plate or two parallel plates.

An asterisk * is attached to the surface number for an aspheric lens surface.

The radius of curvature Ri represents the radius of curvature of $i^{th}$ (i=1, 2, 3, - - - ) surface and the surface distance Di (i=1, 2, 3, - - - ) represents the surface distance between $i^{th}$ surface and $(i+1)^{th}$ surface on the optical axis Z1. The symbols Ri and Di in the lens data correspond to the symbol Si (i=1, 2, 3, - - - ) representing the lens surface or the like.

Ndj represents the refractive index of $j^{th}$ (j=1, 2, 3, - - - ) optical element, in which j increases sequentially from the object side toward the image side, with respect to the wavelength of 587.6 nm (d-line), while vdj represents the Abbe number of $j^{th}$ optical element with reference to the d-line.

In the lens data in Tables 1 to 11, the radius of curvature and surface distance are indicated in mm, and the radius of curvature is indicated as positive if it is convex to the object side and as negative if it is convex to the image side.

Each aspheric surface is defined by the aspheric surface expression given below:

$$Z = \frac{Y^2/R}{1+(1-KA\cdot Y^2/R^2)^{1/2}} + \sum_{i=3}^{n} RAi \cdot Y^i$$

where,
Z: depth of aspheric surface (a length of the vertical line from a point on the aspheric surface at height Y to a flat surface orthogonal to an optical axis to which the aspheric vertex contact) (mm),
Y: height (distance from the optical axis) (mm),
R: paraxial radius of curvature, and
KA, RAi: aspheric coefficients (i=3 to n).

Table 12 indicates values calculated by formulas described in inequality expressions of the conditional expressions (A1), (A2), (B1), (B2), (C1), (C2) and (D) to (M) for each zoom lens of Examples 1 to 11. A value in Table 12 that does not satisfy each of the corresponding conditional expressions (A1), (A2), (B1), (B2), (C1), (C2) and (D) to (M) is underlined.

Note that Tables 1 to 12 will be collectively provided at the end of this section, the "Best Mode for Carrying out the Invention".

FIGS. 13 to 23 show various aberrations of zoom lenses of Example 1 to 11. Each drawing illustrates aberrations with respect to the wavelengths corresponding to the d-line, g-line, and C-line respectively.

The aberration diagrams corresponding to the symbols A to D in each of FIGS. 13 to 23 illustrate aberrations at the wide angle end, in which A is spherical aberration, B is astigmatism, C is distortion, and D is lateral chromatic aberration. The aberration diagrams corresponding to the symbols E to H in each drawing illustrate aberrations at the telephoto end, in which E is spherical aberration, F is astigmatism, G is distortion, and H is lateral chromatic aberration.

Each distortion diagram illustrates a deviation from an ideal image height obtained by f×tan θ, where f is a focal length of the overall lens system and θ is a half angle of view (treated as a variable, $0 \leq \theta \leq \omega$).

As is known from the numerical data, aberration diagrams, and the like, the zoom lenses of the present invention may prevent aberrations while being formed compact with a high zoom ratio.

It should be understood that the present invention is not limited to each of the embodiments described above, and various changes and modifications may be made without departing from the spirit of the invention. For example, values of radius of curvature of each lens, surface distance, refractive index, and the like are not limited to those shown in each table and may take other values.

TABLE 1

(a) Example 1 Basic Lense Data

| Si Surf. No. | Ri R. of Cur. | Di Surf. Dis. | Ndj Ref. index | νdj Abbe No. |
|---|---|---|---|---|
| 1 | 46.6251 | 1.40 | 1.92286 | 20.9 |
| 2 | 29.5216 | 5.01 | 1.49700 | 81.5 |
| 3 | 89.5699 | 0.10 | | |
| 4 | 38.3596 | 3.50 | 1.71300 | 53.9 |
| 5 | 119.2326 | 0.10 | | |
| 6 | 31.0000 | 3.40 | 1.71300 | 53.9 |
| 7 | 71.9969 | D7 | | |
| 8 | 65.8075 | 0.70 | 1.88300 | 40.8 |
| 9 | 5.7106 | 3.30 | | |
| 10 | −30.1825 | 0.71 | 1.90366 | 31.3 |
| 11 | 13.2390 | 2.80 | 1.92286 | 18.9 |
| 12 | −30.5807 | 0.10 | | |
| *13 | 24.4242 | 0.90 | 1.56865 | 58.6 |
| *14 | 16.0000 | D14 | | |
| 15 | ∞(aper. stop) | 1.40 | | |
| *16 | 10.5349 | 3.50 | 1.80348 | 40.5 |
| *17 | 131.0664 | 0.22 | | |
| 18 | 10.3165 | 0.64 | 1.94595 | 18.0 |
| 19 | 7.1991 | D19 | | |
| 20 | 20.1979 | 3.21 | 1.62299 | 58.2 |
| 21 | −11.4870 | 0.68 | 1.84666 | 23.8 |
| 22 | −48.3822 | 0.10 | | |
| 23 | 145.3310 | 1.95 | 1.48749 | 70.2 |
| 24 | −22.6970 | D24 | | |
| 25 | ∞ | 1.61 | 1.51680 | 64.2 |
| 26 | ∞ | 1.36 | | |
| 27 | ∞ | 0.32 | 1.51680 | 64.2 |
| 28 | ∞ | 1.31 | | |

(b) Example 1 Aspheric Data

| Asphe. Coeff. | S13 |
|---|---|
| KA | 1.1834651 |
| RA3 | −3.4142158E−03 |
| RA4 | 3.3718902E−04 |
| RA5 | 3.0667916E−05 |
| RA6 | 9.7852239E−07 |
| RA7 | −7.9667976E−07 |
| RA8 | −2.8032428E−07 |
| RA9 | −1.6873438E−08 |
| RA10 | 2.0276777E−08 |
| Asphe. Coeff. | S14 |
| KA | 1.1468446 |

TABLE 1-continued

| RA3 | −3.6713606E−03 |
|---|---|
| RA4 | 1.6094110E−04 |
| RA5 | 1.6468667E−05 |
| RA6 | −1.5113898E−06 |
| RA7 | −8.7330474E−07 |
| RA8 | −2.3811082E−07 |
| RA9 | −3.1285245E−08 |
| RA10 | 2.1279064E−08 |
| Asphe. Coeff. | S16 |
| KA | 0.5303565 |
| RA3 | 5.4657810E−04 |
| RA4 | −1.1938905E−04 |
| RA5 | 6.7505799E−06 |
| RA6 | 3.1933226E−06 |
| RA7 | 3.1570612E−08 |
| RA8 | −5.4043454E−08 |
| RA9 | −1.2311295E−08 |
| RA10 | 2.3165814E−09 |
| Asphe. Coeff. | S17 |
| KA | 1.0221692 |
| RA3 | 8.4494605E−04 |
| RA4 | −1.9250890E−04 |
| RA5 | 2.5423008E−05 |
| RA6 | 4.2138600E−06 |
| RA7 | −2.4208687E−07 |
| RA8 | −1.5134457E−07 |
| RA9 | 6.7220583E−09 |
| RA10 | 1.7744574E−09 |

(c) Example 1 Zoom Data

| Item | W.A. End | T.P. End |
|---|---|---|
| f | 4.71 | 96.48 |
| Fno. | 1.69 | 3.20 |
| 2ω | 67.0 | 3.5 |
| D7 | 0.85 | 25.90 |
| D14 | 26.36 | 1.30 |
| D19 | 8.81 | 13.46 |
| D24 | 6.92 | 2.27 |

*Aspheric Surface

TABLE 2

(a) Example 2 Basic Lense Data

| Si Surf. No. | Ri R. of Cur. | Di Surf. Dis. | Ndj Ref. index | νdj Abbe No. |
|---|---|---|---|---|
| 1 | 42.7183 | 1.30 | 1.94595 | 18.0 |
| 2 | 29.5628 | 5.56 | 1.43875 | 94.9 |
| 3 | 123.0603 | 0.10 | | |
| 4 | 40.9690 | 4.00 | 1.49700 | 81.5 |
| 5 | 285.6443 | 0.10 | | |
| 6 | 26.6940 | 3.35 | 1.78590 | 44.2 |
| 7 | 62.3890 | D7 | | |
| 8 | 33.4931 | 0.60 | 1.88300 | 40.8 |
| 9 | 5.4921 | 3.50 | | |
| 10 | −41.8878 | 0.61 | 1.90366 | 31.3 |
| 11 | 7.3502 | 3.05 | 1.92286 | 18.9 |
| 12 | ∞ | 0.10 | | |
| *13 | 35.0000 | 1.10 | 1.53389 | 56.0 |
| *14 | 43.7705 | D14 | | |
| 15 | ∞(aper. stop) | 1.40 | | |
| *16 | 10.7291 | 3.00 | 1.86400 | 40.6 |
| *17 | 23.7647 | 0.94 | | |
| 18 | 8.8377 | 0.60 | 1.92286 | 20.9 |
| 19 | 6.7933 | D19 | | |
| 20 | 25.0987 | 2.40 | 1.49700 | 81.5 |
| 21 | −15.7170 | 0.68 | | |
| 22 | −9.0407 | 0.55 | 1.92286 | 18.9 |
| 23 | −13.6351 | 0.10 | | |

TABLE 2-continued

| 24 | 134.0522 | 2.00 | 1.62299 | 58.2 |
|---|---|---|---|---|
| 25 | −13.7779 | D25 | | |
| 26 | ∞ | 1.70 | 1.51680 | 64.2 |
| 27 | ∞ | 2.32 | | |

(b)
Example 2 Aspheric Data

| Asphe. Coeff. | S13 |
|---|---|
| KA | 1.2661435 |
| RA3 | −5.5783791E−03 |
| RA4 | 1.8502951E−02 |
| RA5 | −8.3808780E−02 |
| RA6 | 2.2883906E−01 |
| RA7 | −4.0828549E−01 |
| RA8 | 5.0957718E−01 |
| RA9 | −4.6399400E−01 |
| RA10 | 3.1667363E−01 |
| RA11 | −1.6480690E−01 |
| RA12 | 6.6048569E−02 |
| RA13 | −2.0454941E−02 |
| RA14 | 4.8821794E−03 |
| RA15 | −8.8938937E−04 |
| RA16 | 1.2134201E−04 |
| RA17 | −1.1997289E−05 |
| RA18 | 8.1144363E−07 |
| RA19 | −3.3572686E−08 |
| RA20 | 6.4064200E−10 |
| Asphe. Coeff. | S14 |
| KA | 1.1819002 |
| RA3 | −3.8851571E−03 |
| RA4 | 4.8333654E−04 |
| RA5 | 2.5146645E−05 |
| RA6 | −7.7664992E−06 |
| RA7 | −2.0432233E−06 |
| RA8 | −3.4832048E−07 |
| RA9 | −2.5233303E−08 |
| RA10 | 2.4372757E−08 |
| Asphe. Coeff. | S16 |
| KA | 0.8752779 |
| RA3 | 1.4738144E−04 |
| RA4 | −2.0058097E−05 |
| RA5 | −8.4030926E−07 |
| RA6 | −1.4661270E−06 |
| RA7 | −1.8252083E−07 |
| RA8 | −5.1516039E−08 |
| RA9 | 4.7515248E−09 |
| RA10 | −1.5849431E−09 |
| Asphe. Coeff. | S17 |
| KA | 0.9976528 |
| RA3 | 1.9404025E−04 |
| RA4 | 3.8463350E−05 |
| RA5 | −5.7762955E−06 |
| RA6 | −4.9187995E−06 |
| RA7 | 2.6211017E−07 |
| RA8 | −1.0097436E−07 |
| RA9 | −2.5908759E−08 |
| RA10 | 3.6077920E−09 |

(c)
Example 2 Zoom Data

| Item | W.A. End | T.P. End |
|---|---|---|
| f | 4.74 | 108.97 |
| Fno. | 1.67 | 3.57 |
| 2ω | 63.6 | 3.3 |
| D7 | 0.65 | 22.69 |
| D14 | 23.53 | 1.49 |
| D19 | 7.45 | 15.56 |
| D25 | 11.09 | 2.98 |

*Aspheric Surface

TABLE 3

(a)
Example 3 Basic Lense Data

| Si Surf. No. | Ri R. of Cur. | Di Surf. Dis. | Ndj Ref. index | νdj Abbe No. |
|---|---|---|---|---|
| 1 | 55.7258 | 1.30 | 1.84666 | 23.8 |
| 2 | 31.4680 | 5.51 | 1.49700 | 81.5 |
| 3 | 180.7851 | 0.10 | | |
| 4 | 38.3981 | 3.85 | 1.49700 | 81.5 |
| 5 | 214.4163 | 0.10 | | |
| 6 | 28.1850 | 3.65 | 1.72916 | 54.7 |
| 7 | 69.4144 | D7 | | |
| 8 | 58.5203 | 0.60 | 1.88300 | 40.8 |
| 9 | 5.7994 | 2.99 | | |
| 10 | −80.4441 | 0.61 | 1.90366 | 31.3 |
| 11 | 8.1410 | 3.05 | 1.92286 | 18.9 |
| 12 | ∞ | 0.10 | | |
| *13 | 31.6059 | 1.10 | 1.53389 | 56.0 |
| *14 | 30.7974 | D14 | | |
| 15 | ∞(aper. stop) | 1.40 | | |
| *16 | 9.3502 | 3.05 | 1.80348 | 40.5 |
| *17 | 30.7059 | 0.79 | | |
| 18 | 10.3796 | 0.60 | 1.94595 | 18.0 |
| 19 | 7.0036 | D19 | | |
| 20 | 18.0710 | 2.52 | 1.48749 | 70.2 |
| 21 | −18.0710 | 0.65 | | |
| 22 | −9.9016 | 0.55 | 1.92286 | 20.9 |
| 23 | −14.6719 | 0.10 | | |
| 24 | ∞ | 1.89 | 1.62041 | 60.3 |
| 25 | −15.0932 | D25 | | |
| 26 | ∞ | 1.70 | 1.51680 | 64.2 |
| 27 | ∞ | 1.95 | | |

(b)
Example 3 Aspheric Data

| Asphe. Coeff. | S13 |
|---|---|
| KA | 2.7419007 |
| RA3 | −5.2359383E−03 |
| RA4 | 1.4971721E−03 |
| RA5 | 4.6523123E−05 |
| RA6 | −1.0000266E−04 |
| RA7 | 1.3677271E−05 |
| RA8 | 2.0091869E−06 |
| RA9 | −8.8109492E−07 |
| RA10 | 9.1289923E−08 |
| Asphe. Coeff. | S14 |
| KA | 1.4330560 |
| RA3 | −5.4234803E−03 |
| RA4 | 1.7173315E−03 |
| RA5 | −3.7957956E−04 |
| RA6 | 5.7133890E−05 |
| RA7 | −5.9353837E−06 |
| RA8 | −1.5544458E−06 |
| RA9 | 3.3928620E−07 |
| RA10 | −4.3765378E−09 |
| Asphe. Coeff. | S16 |
| KA | 0.8886009 |
| RA3 | 2.2615668E−04 |
| RA4 | −4.1248257E−05 |
| RA5 | 8.7632146E−07 |
| RA6 | 1.6831010E−06 |
| RA7 | −2.5972466E−07 |
| RA8 | −7.5128394E−08 |
| RA9 | 2.8500357E−08 |
| RA10 | −2.4785133E−09 |
| Asphe. Coeff. | S17 |
| KA | 1.0062459 |
| RA3 | 3.3012895E−04 |
| RA4 | 4.9825118E−05 |
| RA5 | 4.7147813E−06 |
| RA6 | −3.3425450E−06 |
| RA7 | 7.9222740E−07 |
| RA8 | −6.0378299E−09 |

TABLE 3-continued

| | |
|---|---|
| RA9 | −7.8511023E−09 |
| RA10 | −1.4425070E−10 |

(c)
Example 3 Zoom Data

| Item | W.A. End | T.P. End |
|---|---|---|
| f | 4.82 | 102.54 |
| Fno. | 1.67 | 3.28 |
| 2ω | 62.3 | 3.2 |
| D7 | 0.65 | 24.00 |
| D14 | 24.85 | 1.50 |
| D19 | 8.06 | 14.78 |
| D25 | 10.07 | 3.36 |

*Aspheric Surface

TABLE 4

(a)
Example 4 Basic Lense Data

| Si Surf. No. | Ri R. of Cur. | Di Surf. Dis. | Ndj Ref. index | νdj Abbe No. |
|---|---|---|---|---|
| 1 | 57.5056 | 1.30 | 1.84666 | 23.8 |
| 2 | 32.5000 | 5.48 | 1.49700 | 81.5 |
| 3 | 221.3402 | 0.10 | | |
| 4 | 36.9662 | 3.95 | 1.49700 | 81.5 |
| 5 | 179.0131 | 0.10 | | |
| 6 | 28.8416 | 3.37 | 1.72916 | 54.7 |
| 7 | 68.1290 | D7 | | |
| 8 | 80.7417 | 0.60 | 1.88300 | 40.8 |
| 9 | 5.9188 | 2.80 | | |
| 10 | −110.9857 | 0.61 | 1.90366 | 31.3 |
| 11 | 8.2605 | 3.05 | 1.92286 | 18.9 |
| 12 | 233.2473 | 0.10 | | |
| *13 | 31.6059 | 1.10 | 1.53389 | 56.0 |
| *14 | 30.7974 | D14 | | |
| 15 | ∞(aper. stop) | 1.40 | | |
| 16 | 9.7666 | 3.00 | 1.77377 | 47.2 |
| *17 | 49.3791 | 0.70 | | |
| 18 | 9.4061 | 0.60 | 1.92286 | 18.9 |
| 19 | 6.8129 | D19 | | |
| 20 | 23.4397 | 2.40 | 1.51633 | 64.1 |
| 21 | −24.0000 | 0.73 | | |
| 22 | −9.9500 | 0.55 | 1.92286 | 18.9 |
| 23 | −14.6000 | 0.10 | | |
| 24 | ∞ | 1.80 | 1.62299 | 58.2 |
| 25 | −14.3190 | D25 | | |
| 26 | ∞ | 1.70 | 1.51680 | 64.2 |
| 27 | ∞ | 0.77 | | |

(b)
Example 4 Aspheric Data

| Asphe. Coeff. | S13 |
|---|---|
| KA | 1.2590480 |
| RA3 | −5.4323387E−03 |
| RA4 | 1.8458669E−02 |
| RA5 | −8.3800156E−02 |
| RA6 | 2.2884078E−01 |
| RA7 | −4.0828552E−01 |
| RA8 | 5.0957713E−01 |
| RA9 | −4.6399401E−01 |
| RA10 | 3.1667363E−01 |
| RA11 | −1.6480690E−01 |
| RA12 | 6.6048569E−02 |
| RA13 | −2.0454941E−02 |
| RA14 | 4.8821794E−03 |
| RA15 | −8.8938937E−04 |
| RA16 | 1.2134201E−04 |
| RA17 | −1.1997289E−05 |
| RA18 | 8.1144363E−07 |
| RA19 | −3.3572686E−08 |
| RA20 | 6.4064200E−10 |
| Asphe. Coeff. | S14 |

TABLE 4-continued

| | |
|---|---|
| KA | 1.1819002 |
| RA3 | −3.8851571E−03 |
| RA4 | 4.8333654E−04 |
| RA5 | 2.5146645E−05 |
| RA6 | −7.7664992E−06 |
| RA7 | −2.0432233E−06 |
| RA8 | −3.4832048E−07 |
| RA9 | −2.5233303E−08 |
| RA10 | 2.4372757E−08 |
| Asphe. Coeff. | S17 |
| KA | 1.0121809 |
| RA3 | 6.8931245E−05 |
| RA4 | 1.1744637E−04 |
| RA5 | −7.8144425E−06 |
| RA6 | −3.1884284E−07 |
| RA7 | 6.5799076E−07 |
| RA8 | −3.4687244E−08 |
| RA9 | −1.4287516E−08 |
| RA10 | 1.3837675E−09 |

(c)
Example 4 Zoom Data

| Item | W.A. End | T.P. End |
|---|---|---|
| f | 4.81 | 102.22 |
| Fno. | 1.66 | 3.45 |
| 2ω | 65.8 | 3.5 |
| D7 | 0.65 | 24.49 |
| D14 | 25.04 | 1.20 |
| D19 | 8.47 | 14.46 |
| D25 | 10.41 | 4.41 |

*Aspheric Surface

TABLE 5

(a)
Example 5 Basic Lense Data

| Si Surf. No. | Ri R. of Cur. | Di Surf. Dis. | Ndj Ref. index | νdj Abbe No. |
|---|---|---|---|---|
| 1 | 49.0811 | 1.30 | 1.94595 | 18.0 |
| 2 | 32.6747 | 5.56 | 1.43875 | 94.9 |
| 3 | 157.8222 | 0.10 | | |
| 4 | 42.8997 | 4.00 | 1.49700 | 81.5 |
| 5 | 313.5051 | 0.10 | | |
| 6 | 27.6702 | 3.35 | 1.78590 | 44.2 |
| 7 | 65.7808 | D7 | | |
| 8 | 46.2078 | 0.60 | 1.88300 | 40.8 |
| 9 | 5.7344 | 3.10 | | |
| 10 | −63.4785 | 0.61 | 1.90366 | 31.3 |
| 11 | 7.5057 | 3.05 | 1.92286 | 18.9 |
| 12 | ∞ | 0.10 | | |
| *13 | 35.0000 | 1.10 | 1.53389 | 56.0 |
| *14 | 43.7705 | D14 | | |
| 15 | ∞(aper. stop) | 1.40 | | |
| *16 | 9.7450 | 3.00 | 1.80348 | 40.5 |
| *17 | 23.6658 | 0.94 | | |
| 18 | 9.1103 | 0.60 | 1.94595 | 18.0 |
| 19 | 6.8045 | D19 | | |
| 20 | 19.6784 | 2.40 | 1.48749 | 70.2 |
| 21 | −18.0432 | 0.68 | | |
| 22 | −9.6248 | 0.55 | 1.92286 | 18.9 |
| 23 | −13.8922 | 0.10 | | |
| 24 | 237.2688 | 1.80 | 1.62299 | 58.2 |
| 25 | −15.0336 | D25 | | |
| 26 | ∞ | 1.70 | 1.51680 | 64.2 |
| 27 | ∞ | 2.19 | | |

(b)
Example 5 Aspheric Data

| Asphe. Coeff. | S13 |
|---|---|
| KA | 1.2658882 |
| RA3 | −5.5546402E−03 |
| RA4 | 1.8502234E−02 |

TABLE 5-continued

| | |
|---|---|
| RA5 | -8.3806206E-02 |
| RA6 | 2.2883937E-01 |
| RA7 | -4.0828551E-01 |
| RA8 | 5.0957717E-01 |
| RA9 | -4.6399400E-01 |
| RA10 | 3.1667363E-01 |
| RA11 | -1.6480690E-01 |
| RA12 | 6.6048569E-02 |
| RA13 | -2.0454941E-02 |
| RA14 | 4.8821794E-03 |
| RA15 | -8.8938937E-04 |
| RA16 | 1.2134201E-04 |
| RA17 | -1.1997289E-05 |
| RA18 | 8.1144363E-07 |
| RA19 | -3.3572686E-08 |
| RA20 | 6.4064200E-10 |
| Asphe. Coeff. | S14 |
| KA | 1.1819002 |
| RA3 | -3.8851571E-03 |
| RA4 | 4.8333654E-04 |
| RA5 | 2.5146645E-05 |
| RA6 | -7.7664992E-06 |
| RA7 | -2.0432233E-06 |
| RA8 | -3.4832048E-07 |
| RA9 | -2.5233303E-08 |
| RA10 | 2.4372757E-08 |
| Asphe. Coeff. | S16 |
| KA | 0.872548 |
| RA3 | 1.4683069E-04 |
| RA4 | -1.3159263E-05 |
| RA5 | 3.1079403E-06 |
| RA6 | -1.0540577E-06 |
| RA7 | -2.3350201E-07 |
| RA8 | -4.0873342E-08 |
| RA9 | 1.2922684E-08 |
| RA10 | -2.1578031E-09 |
| Asphe. Coeff. | S17 |
| KA | 1.008673 |
| RA3 | 2.1109409E-04 |
| RA4 | 7.4795410E-05 |
| RA5 | -4.0702239E-06 |
| RA6 | -3.3824079E-06 |
| RA7 | 4.2237061E-07 |
| RA8 | -9.4170905E-08 |
| RA9 | -2.1497709E-08 |
| RA10 | 2.5458077E-09 |

(c)
Example 5 Zoom Data

| Item | W.A. End | T.P. End |
|---|---|---|
| f | 4.79 | 101.73 |
| Fno. | 1.67 | 3.38 |
| 2ω | 64.5 | 3.3 |
| D7 | 0.65 | 24.06 |
| D14 | 24.91 | 1.49 |
| D19 | 7.41 | 14.70 |
| D25 | 10.42 | 3.13 |

*Aspheric Surface

TABLE 6

(a)
Example 6 Basic Lense Data

| Si Surf. No. | Ri R. of Cur. | Di Surf. Dis. | Ndj Ref. index | νdj Abbe No. |
|---|---|---|---|---|
| 1 | 52.9556 | 1.30 | 1.84666 | 23.8 |
| 2 | 30.8076 | 5.51 | 1.49700 | 81.5 |
| 3 | 152.2689 | 0.10 | | |
| 4 | 37.1946 | 3.80 | 1.49700 | 81.5 |
| 5 | 226.7644 | 0.10 | | |
| 6 | 28.3054 | 3.50 | 1.72916 | 54.7 |
| 7 | 65.6452 | D7 | | |
| 8 | 49.6015 | 0.60 | 1.88300 | 40.8 |
| 9 | 5.7278 | 2.80 | | |
| 10 | -70.0909 | 0.61 | 1.90366 | 31.3 |
| 11 | 7.9254 | 3.05 | 1.92286 | 18.9 |
| 12 | ∞ | 0.10 | | |
| *13 | 32.5958 | 1.10 | 1.53389 | 56.0 |
| *14 | 31.3837 | D14 | | |
| 15 | ∞(aper. stop) | 1.40 | | |
| *16 | 8.5215 | 3.00 | 1.80348 | 40.5 |
| *17 | 33.5477 | 0.72 | | |
| 18 | 10.5000 | 0.60 | 1.92286 | 18.9 |
| 19 | 6.4000 | D19 | | |
| 20 | 18.9108 | 2.40 | 1.48749 | 70.2 |
| 21 | -18.9108 | 0.68 | | |
| 22 | -9.5251 | 0.55 | 1.92286 | 18.9 |
| 23 | -13.6206 | 0.39 | | |
| 24 | ∞ | 1.80 | 1.62299 | 58.2 |
| 25 | -14.3151 | D25 | | |
| 26 | ∞ | 1.70 | 1.51680 | 64.2 |
| 27 | ∞ | 2.25 | | |

(b)
Example 6 Aspheric Data

| Asphe. Coeff. | S13 |
|---|---|
| KA | 1.2611764 |
| RA3 | -5.6112744E-03 |
| RA4 | 1.8472342E-02 |
| RA5 | -8.3800974E-02 |
| RA6 | 2.2884060E-01 |
| RA7 | -4.0828545E-01 |
| RA8 | 5.0957715E-01 |
| RA9 | -4.6399400E-01 |
| RA10 | 3.1667363E-01 |
| RA11 | -1.6480690E-01 |
| RA12 | 6.6048569E-02 |
| RA13 | -2.0454941E-02 |
| RA14 | 4.8821794E-03 |
| RA15 | -8.8938937E-04 |
| RA16 | 1.2134201E-04 |
| RA17 | -1.1997289E-05 |
| RA18 | 8.1144363E-07 |
| RA19 | -3.3572686E-08 |
| RA20 | 6.4064200E-10 |
| Asphe. Coeff. | S14 |
| KA | 1.1797938 |
| RA3 | -3.9770122E-03 |
| RA4 | 4.6568032E-04 |
| RA5 | 2.7269815E-05 |
| RA6 | -7.3285772E-06 |
| RA7 | -2.0248949E-06 |
| RA8 | -3.5960454E-07 |
| RA9 | -2.7166840E-08 |
| RA10 | 2.4562338E-08 |
| Asphe. Coeff. | S16 |
| KA | 0.9085578 |
| RA3 | 2.5007142E-04 |
| RA4 | -4.5247178E-05 |
| RA5 | -5.6881078E-07 |
| RA6 | -4.3542743E-07 |
| RA7 | 1.4000261E-08 |
| RA8 | -3.0040236E-08 |
| RA9 | -4.5388953E-09 |
| RA10 | 6.5099726E-10 |
| Asphe. Coeff. | S17 |
| KA | 1.0099415 |
| RA3 | 3.6143324E-04 |
| RA4 | 8.9948661E-05 |
| RA5 | -5.6759826E-06 |
| RA6 | -2.7739453E-06 |
| RA7 | 3.9461639E-07 |
| RA8 | -2.7307191E-08 |

TABLE 6-continued

| | |
|---|---|
| RA9 | −1.1541869E−08 |
| RA10 | 1.6942914E−09 |

(c) Example 6 Zoom Data

| Item | W.A. End | T.P. End |
|---|---|---|
| f | 4.85 | 103.00 |
| Fno. | 1.66 | 3.40 |
| 2ω | 62.8 | 3.5 |
| D7 | 0.65 | 24.01 |
| D14 | 24.85 | 1.49 |
| D19 | 9.08 | 15.22 |
| D25 | 9.16 | 3.03 |

*Aspheric Surface

TABLE 7

(a) Example 7 Basic Lense Data

| Si Surf. No. | Ri R. of Cur. | Di Surf. Dis. | Ndj Ref. index | vdj Abbe No. |
|---|---|---|---|---|
| 1 | 55.2167 | 1.30 | 1.84666 | 23.8 |
| 2 | 31.4640 | 5.51 | 1.49700 | 81.5 |
| 3 | 142.5803 | 0.10 | | |
| 4 | 42.8762 | 3.80 | 1.49700 | 81.5 |
| 5 | 313.8776 | 0.10 | | |
| 6 | 28.4401 | 3.55 | 1.72916 | 54.7 |
| 7 | 74.8798 | D7 | | |
| 8 | 84.1410 | 0.60 | 1.88300 | 40.8 |
| 9 | 5.8698 | 2.80 | | |
| 10 | −82.1272 | 0.61 | 1.90366 | 31.3 |
| 11 | 8.1500 | 3.05 | 1.92286 | 18.9 |
| 12 | ∞ | 0.10 | | |
| *13 | 31.6059 | 1.10 | 1.53389 | 56.0 |
| *14 | 30.7974 | D14 | | |
| 15 | ∞(aper. stop) | 1.40 | | |
| *16 | 9.1821 | 3.00 | 1.80348 | 40.5 |
| *17 | 29.9807 | 0.70 | | |
| 18 | 10.2594 | 0.60 | 1.94595 | 18.0 |
| 19 | 6.9000 | D19 | | |
| 20 | 18.5895 | 2.40 | 1.48749 | 70.2 |
| 21 | −18.5895 | 0.68 | | |
| 22 | −9.9250 | 0.55 | 1.92286 | 20.9 |
| 23 | −14.9000 | 0.10 | | |
| 24 | ∞ | 1.80 | 1.62299 | 58.2 |
| 25 | −14.9014 | D25 | | |
| 26 | ∞ | 1.70 | 1.51680 | 64.2 |
| 27 | ∞ | 2.35 | | |

(b) Example 7 Aspheric Data

| Asphe. Coeff. | S13 |
|---|---|
| KA | 1.2590480 |
| RA3 | −5.4323387E−03 |
| RA4 | 1.8458669E−02 |
| RA5 | −8.3800156E−02 |
| RA6 | 2.2884078E−01 |
| RA7 | −4.0828552E−01 |
| RA8 | 5.0957713E−01 |
| RA9 | −4.6399401E−01 |
| RA10 | 3.1667363E−01 |
| RA11 | −1.6480690E−01 |
| RA12 | 6.6048569E−02 |
| RA13 | −2.0454941E−02 |
| RA14 | 4.8821794E−03 |
| RA15 | −8.8938937E−04 |
| RA16 | 1.2134201E−04 |
| RA17 | −1.1997289E−05 |
| RA18 | 8.1144363E−07 |
| RA19 | −3.3572686E−08 |
| RA20 | 6.4064200E−10 |
| Asphe. Coeff. | S14 |

TABLE 7-continued

| | |
|---|---|
| KA | 1.1819002 |
| RA3 | −3.8851571E−03 |
| RA4 | 4.8333654E−04 |
| RA5 | 2.5146645E−05 |
| RA6 | −7.7664992E−06 |
| RA7 | −2.0432233E−06 |
| RA8 | −3.4832048E−07 |
| RA9 | −2.5233303E−08 |
| RA10 | 2.4372757E−08 |
| Asphe. Coeff. | S16 |
| KA | 0.9905186 |
| RA3 | 9.6051366E−05 |
| RA4 | −4.2834240E−06 |
| RA5 | −9.4976029E−07 |
| RA6 | −1.1597977E−07 |
| RA7 | 4.4991318E−10 |
| RA8 | −5.2274392E−09 |
| RA9 | 1.2621872E−09 |
| RA10 | 3.1245105E−11 |
| Asphe. Coeff. | S17 |
| KA | 1.0141510 |
| RA3 | 1.9329569E−04 |
| RA4 | 1.1140144E−04 |
| RA5 | −2.0471403E−06 |
| RA6 | −2.0311164E−06 |
| RA7 | 6.4457224E−07 |
| RA8 | −3.5422669E−08 |
| RA9 | −3.4856769E−09 |
| RA10 | 3.8598034E−10 |

(c) Example 7 Zoom Data

| Item | W.A. End | T.P. End |
|---|---|---|
| f | 4.62 | 124.80 |
| Fno. | 1.68 | 4.15 |
| 2ω | 68.3 | 2.7 |
| D7 | 0.65 | 25.58 |
| D14 | 25.62 | 0.69 |
| D19 | 7.84 | 16.78 |
| D25 | 9.86 | 0.92 |

*Aspheric Surface

TABLE 8

(a) Example 8 Basic Lense Data

| Si Surf. No. | Ri R. of Cur. | Di Surf. Dis. | Ndj Ref. index | vdj Abbe No. |
|---|---|---|---|---|
| 1 | 50.8167 | 1.30 | 1.84666 | 23.8 |
| 2 | 27.2759 | 6.31 | 1.49700 | 81.5 |
| 3 | −201.5390 | 0.10 | | |
| 4 | 24.6531 | 3.50 | 1.77250 | 49.6 |
| 5 | 75.9528 | D5 | | |
| 6 | −9823.7033 | 0.60 | 1.88300 | 40.8 |
| 7 | 5.8383 | 2.60 | | |
| 8 | −192.8129 | 0.61 | 1.90366 | 31.3 |
| 9 | 10.4390 | 2.80 | 1.92286 | 18.9 |
| 10 | −68.1109 | 0.10 | | |
| *11 | 38.0272 | 1.10 | 1.53105 | 55.5 |
| *12 | 24.3339 | D12 | | |
| 13 | ∞(aper. stop) | 1.40 | | |
| *14 | 9.1243 | 3.20 | 1.80348 | 40.5 |
| *15 | 114.4691 | 0.18 | | |
| 16 | 12.0694 | 0.60 | 1.84666 | 23.8 |
| 17 | 6.8158 | D17 | | |
| 18 | 27.1595 | 2.20 | 1.50019 | 65.0 |
| 19 | −16.0478 | 0.70 | | |
| 20 | −9.4286 | 0.55 | 1.92000 | 19.0 |
| 21 | −15.7593 | 0.10 | | |
| 22 | 297.3325 | 1.80 | 1.58337 | 61.8 |
| 23 | −13.0693 | D23 | | |
| 24 | ∞ | 12.80 | 1.70155 | 41.1 |

TABLE 8-continued

| 25 | ∞ | 3.55 | 1.51680 | 64.2 |
|----|---|------|---------|------|
| 26 | ∞ | 1.31 | | |

(b) Example 8 Aspheric Data

| Asphe. Coeff. | S11 |
|---|---|
| KA | 1.2665952 |
| RA3 | −2.0553727E−03 |
| RA4 | 7.0350589E−04 |
| RA5 | 5.3380853E−06 |
| RA6 | −4.5570313E−07 |
| RA7 | −2.9963260E−08 |
| RA8 | −5.7862410E−08 |
| RA9 | 1.7540704E−08 |
| RA10 | 2.5262445E−08 |
| Asphe. Coeff. | S12 |
| KA | 1.1645914 |
| RA3 | −2.0385785E−03 |
| RA4 | 2.9974252E−04 |
| RA5 | 6.4317051E−06 |
| RA6 | −1.1853777E−06 |
| RA7 | −5.6529088E−07 |
| RA8 | −2.5866563E−07 |
| RA9 | −2.1575259E−08 |
| RA10 | 4.1231559E−08 |
| Asphe. Coeff. | S14 |
| KA | 0.9603139 |
| RA3 | 1.3711827E−04 |
| RA4 | −8.7090908E−05 |
| RA5 | 1.6800319E−06 |
| RA6 | −1.1150609E−06 |
| RA7 | 1.1408498E−07 |
| RA8 | 4.0840574E−08 |
| RA9 | −1.5000247E−08 |
| RA10 | 1.2248868E−09 |
| Asphe. Coeff. | S15 |
| KA | 1.0065562 |
| RA3 | 2.2292232E−04 |
| RA4 | 1.2285652E−05 |
| RA5 | −8.3971441E−07 |
| RA6 | 1.5379468E−06 |
| RA7 | −4.4114473E−08 |
| RA8 | −9.7203220E−08 |
| RA9 | 1.8394043E−08 |
| RA10 | −8.2286094E−10 |

(c) Example 8 Zoom Data

| Item | W.A. End | T.P. End |
|---|---|---|
| f | 5.00 | 57.54 |
| Fno. | 1.67 | 2.36 |
| 2ω | 65.2 | 6.0 |
| D5 | 0.85 | 22.87 |
| D12 | 23.40 | 1.38 |
| D17 | 9.12 | 7.40 |
| D23 | 0.93 | 2.65 |

*Aspheric Surface

TABLE 9

(a) Example 9 Basic Lense Data

| Si Surf. No. | Ri R. of Cur. | Di Surf. Dis. | Ndj Ref. index | νdj Abbe No. |
|---|---|---|---|---|
| 1 | 57.5056 | 1.30 | 1.84666 | 23.8 |
| 2 | 32.5000 | 5.48 | 1.49700 | 81.5 |
| 3 | 221.3402 | 0.10 | | |
| 4 | 36.9662 | 3.95 | 1.49700 | 81.5 |
| 5 | 179.0131 | 0.10 | | |
| 6 | 28.8416 | 3.37 | 1.72916 | 54.7 |
| 7 | 68.1290 | D7 | | |
| 8 | 87.3859 | 0.60 | 1.88300 | 40.8 |
| 9 | 5.8843 | 2.80 | | |
| 10 | −85.5811 | 0.61 | 1.90366 | 31.3 |
| 11 | 8.2605 | 3.05 | 1.92286 | 18.9 |
| 12 | 1040.6021 | 0.10 | | |
| *13 | 31.6059 | 1.10 | 1.53389 | 56.0 |
| *14 | 30.7974 | D14 | | |
| 15 | ∞(aper. stop) | 1.40 | | |
| 16 | 9.9758 | 3.00 | 1.74320 | 49.3 |
| *17 | 64.7768 | 0.70 | | |
| 18 | 9.4533 | 0.60 | 1.94595 | 18.0 |
| 19 | 7.0000 | D19 | | |
| 20 | 24.0937 | 2.40 | 1.51633 | 64.1 |
| 21 | −24.0000 | 0.73 | | |
| 22 | −9.9500 | 0.55 | 1.92286 | 18.9 |
| 23 | −14.6000 | 0.10 | | |
| 24 | ∞ | 1.80 | 1.62299 | 58.2 |
| 25 | −14.5623 | D25 | | |
| 26 | ∞ | 1.70 | 1.51680 | 64.2 |
| 27 | ∞ | 2.80 | | |

(b) Example 9 Aspheric Data

| Asphe. Coeff. | S13 |
|---|---|
| KA | 1.2590480 |
| RA3 | −5.4323387E−03 |
| RA4 | 1.8458669E−02 |
| RA5 | −8.3800156E−02 |
| RA6 | 2.2884078E−01 |
| RA7 | −4.0828552E−01 |
| RA8 | 5.0957713E−01 |
| RA9 | −4.6399401E−01 |
| RA10 | 3.1667363E−01 |
| RA11 | −1.6480690E−01 |
| RA12 | 6.0448569E−02 |
| RA13 | −2.0454941E−02 |
| RA14 | 4.8821794E−03 |
| RA15 | −8.8938937E−04 |
| RA16 | 1.2134201E−04 |
| RA17 | −1.1997289E−05 |
| RA18 | 8.1144363E−07 |
| RA19 | −3.3572686E−08 |
| RA20 | 6.4064200E−10 |
| Asphe. Coeff. | S14 |
| KA | 1.1819002 |
| RA3 | −3.8851571E−03 |
| RA4 | 4.8333654E−04 |
| RA5 | 2.5146645E−05 |
| RA6 | −7.7664992E−06 |
| RA7 | −2.0432233E−06 |
| RA8 | −3.4832048E−07 |
| RA9 | −2.5233303E−08 |
| RA10 | 2.4372757E−08 |
| Asphe. Coeff. | S17 |
| KA | 1.0122666 |
| RA3 | 4.5857030E−05 |
| RA4 | 1.2383352E−04 |
| RA5 | −7.8569047E−06 |
| RA6 | −5.9356518E−07 |
| RA7 | 6.0558793E−07 |
| RA8 | −3.1920160E−08 |
| RA9 | −1.0102370E−08 |
| RA10 | 9.1900825E−10 |

(c) Example 9 Zoom Data

| Item | W.A. End | T.P. End |
|---|---|---|
| f | 4.79 | 101.86 |
| Fno. | 1.67 | 3.44 |
| 2ω | 66.3 | 3.5 |
| D7 | 0.65 | 24.54 |
| D14 | 25.09 | 1.20 |
| D19 | 8.45 | 14.45 |
| D25 | 8.38 | 2.39 |

*Aspheric Surface

TABLE 10

(a) Example 10 Basic Lense Data

| Si Surf. No. | Ri R. of Cur. | Di Surf. Dis. | Ndj Ref. index | νdj Abbe No. |
|---|---|---|---|---|
| 1 | 50.2815 | 1.55 | 1.92286 | 20.9 |
| 2 | 34.1434 | 6.31 | 1.49700 | 81.5 |
| 3 | 143.5371 | 0.10 | | |
| 4 | 41.3017 | 4.50 | 1.61800 | 63.3 |
| 5 | 157.2619 | 0.10 | | |
| 6 | 32.4790 | 3.00 | 1.72916 | 54.7 |
| 7 | 66.0618 | D7 | | |
| 8 | 76.5809 | 0.72 | 2.00069 | 25.5 |
| 9 | 7.0661 | 3.80 | | |
| 10 | −31.0614 | 0.71 | 1.88300 | 40.8 |
| 11 | 10.0000 | 4.10 | 1.92286 | 20.9 |
| 12 | −27.6050 | 0.10 | | |
| *13 | 34.6344 | 1.00 | 1.50957 | 56.4 |
| *14 | 18.1050 | D14 | | |
| 15 | ∞(aper. stop) | 2.09 | | |
| *16 | 12.8011 | 2.80 | 1.80348 | 40.5 |
| *17 | −477.5097 | 2.90 | | |
| 18 | 800.0000 | 0.66 | 1.80518 | 25.4 |
| 19 | 12.2673 | D19 | | |
| 20 | 18.5440 | 3.80 | 1.49700 | 81.5 |
| 21 | −24.8153 | 1.00 | | |
| 22 | −12.5000 | 0.75 | 1.92286 | 18.9 |
| 23 | −39.7795 | 0.10 | | |
| *24 | 26.5943 | 3.80 | 1.80348 | 40.5 |
| *25 | −14.9415 | D25 | | |
| 26 | ∞ | 1.65 | 1.51680 | 64.2 |
| 27 | ∞ | 1.40 | | |
| 28 | ∞ | 0.33 | 1.51680 | 64.2 |
| 29 | ∞ | 1.03 | | |

(b) Example 10 Aspheric Data

| Asphe. Coeff. | S13 |
|---|---|
| KA | 1.0221322 |
| RA3 | −1.9235797E−03 |
| RA4 | 1.3027966E−04 |
| RA5 | 1.7366520E−05 |
| RA6 | 1.5046889E−06 |
| RA7 | −3.3345113E−07 |
| RA8 | −1.6110754E−07 |
| RA9 | −1.3984814E−08 |
| RA10 | 6.3300277E−09 |
| Asphe. Coeff. | S14 |
| KA | 1.0918486 |
| RA3 | −2.3482760E−03 |
| RA4 | 1.1799512E−04 |
| RA5 | 7.7277771E−06 |
| RA6 | −1.9295649E−06 |
| RA7 | −4.4497886E−07 |
| RA8 | −8.2921405E−08 |
| RA9 | −1.8117618E−08 |
| RA10 | 6.2396871E−09 |
| Asphe. Coeff. | S16 |
| KA | 1.1141400 |
| RA3 | −2.0387453E−04 |
| RA4 | 2.9989879E−05 |
| RA5 | 3.0568721E−06 |
| RA6 | 8.3758704E−07 |
| RA7 | −8.8168370E−08 |
| RA8 | −4.1671084E−08 |
| RA9 | 2.5841847E−09 |
| RA10 | 1.9748703E−09 |
| Asphe. Coeff. | S17 |
| KA | 1.0198806 |
| RA3 | 1.2250179E−04 |
| RA4 | −1.9184111E−05 |
| RA5 | 1.2085674E−05 |
| RA6 | 2.2162502E−06 |
| RA7 | 9.4573739E−08 |
| RA8 | −7.0105553E−08 |
| RA9 | −1.5557198E−08 |
| RA10 | 5.1597480E−09 |
| Asphe. Coeff. | S24 |
| KA | 4.5688868 |
| RA3 | 2.8657767E−04 |
| RA4 | −1.7134058E−04 |
| RA5 | 1.6753686E−06 |
| RA6 | −4.3416944E−07 |
| RA7 | 4.6375967E−07 |
| RA8 | −1.7513336E−10 |
| RA9 | −1.3944979E−08 |
| RA10 | 1.2200677E−09 |
| Asphe. Coeff. | S25 |
| KA | 1.7205810 |
| RA3 | −1.2964779E−04 |
| RA4 | 2.1434286E−04 |
| RA5 | −4.1522668E−05 |
| RA6 | 2.3115174E−06 |
| RA7 | 6.2401239E−07 |
| RA8 | −3.2871543E−09 |
| RA9 | −1.7542560E−08 |
| RA10 | 1.4799733E−09 |

(c) Example 10 Zoom Data

| Item | W.A. End | T.P. End |
|---|---|---|
| f | 4.73 | 115.89 |
| Fno. | 1.65 | 3.29 |
| 2ω | 66.2 | 3.1 |
| D7 | 0.90 | 26.58 |
| D14 | 27.19 | 1.50 |
| D19 | 5.93 | 13.78 |
| D25 | 9.79 | 1.94 |

*Aspheric Surface

TABLE 11

(a) Example 11 Basic Lense Data

| Si Surf. No. | Ri R. of Cur. | Di Surf. Dis. | Ndj Ref. index | νdj Abbe No. |
|---|---|---|---|---|
| 1 | 52.4897 | 1.40 | 1.92286 | 20.9 |
| 2 | 32.5480 | 5.01 | 1.49700 | 81.5 |
| 3 | 135.7237 | 0.10 | | |
| 4 | 39.3757 | 3.50 | 1.62299 | 58.2 |
| 5 | 125.4396 | 0.10 | | |
| 6 | 28.7292 | 3.30 | 1.71300 | 53.9 |
| 7 | 68.1394 | D7 | | |
| 8 | 55.0733 | 0.70 | 1.90366 | 31.3 |
| 9 | 5.6493 | 3.25 | | |
| 10 | −22.6969 | 0.71 | 1.88300 | 40.8 |
| 11 | 12.4053 | 2.80 | 1.92286 | 18.9 |
| 12 | −29.7524 | 0.10 | | |
| *13 | 25.0000 | 0.90 | 1.50957 | 56.4 |
| *14 | 20.0000 | D14 | | |
| 15 | ∞(aper. stop) | 1.40 | | |
| 16 | 10.1643 | 3.20 | 1.80348 | 40.5 |
| *17 | 63.9323 | 0.10 | | |
| 18 | 10.2000 | 0.64 | 1.94595 | 18.0 |
| 19 | 7.1500 | D19 | | |
| 20 | 20.0335 | 3.20 | 1.48749 | 70.2 |
| 21 | −10.4871 | 0.20 | | |
| 22 | −9.3690 | 0.68 | 1.84666 | 23.8 |
| 23 | −23.4490 | 0.16 | | |
| 24 | −68.8004 | 1.95 | 1.71300 | 53.9 |
| 25 | −14.3006 | D25 | | |
| 26 | ∞ | 1.61 | 1.51680 | 64.2 |
| 27 | ∞ | 1.36 | | |

TABLE 11-continued

| 28 | ∞ | 0.32 | 1.51680 | 64.2 |
| 29 | ∞ | 1.83 | | |

(b)
Example 11 Aspheric Data

| Asphe. Coeff. | S13 |
|---|---|
| KA | 1.1952740 |
| RA3 | −2.8762923E−03 |
| RA4 | 3.7600439E−04 |
| RA5 | 3.1505834E−05 |
| RA6 | 2.0429052E−07 |
| RA7 | −1.0795740E−06 |
| RA8 | −3.3276843E−07 |
| RA9 | −1.6978683E−08 |
| RA10 | 2.4854246E−08 |
| Asphe. Coeff. | S14 |
| KA | 1.1615800 |
| RA3 | −3.0498151E−03 |
| RA4 | 2.0345542E−04 |
| RA5 | 1.4388915E−05 |
| RA6 | −2.4200859E−06 |
| RA7 | −1.0467859E−06 |
| RA8 | −2.6276862E−07 |
| RA9 | −2.9600901E−08 |
| RA10 | 2.4600012E−08 |
| Asphe. Coeff. | S17 |
| KA | 1.0241655 |
| RA3 | 1.3934992E−04 |
| RA4 | 3.2634233E−05 |
| RA5 | 1.8815609E−05 |
| RA6 | 4.0928146E−07 |
| RA7 | −5.6630787E−07 |
| RA8 | −5.8924489E−08 |
| RA9 | 3.3392260E−08 |
| RA10 | −2.7671859E−09 |

(c)
Example 11 Zoom Data

| Item | W.A. End | T.P. End |
|---|---|---|
| f | 4.70 | 79.93 |
| Fno. | 1.69 | 2.66 |
| 2ω | 66.9 | 4.3 |
| D7 | 0.85 | 25.18 |
| D14 | 25.69 | 1.36 |
| D19 | 8.23 | 10.56 |
| D25 | 7.74 | 5.42 |

*Aspheric Surface ing, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:
the third lens group is composed of a third group first lens which is a single lens with at least one surface being aspheric and has a positive power and a third group second lens which is a single lens with an image side surface being concave to the image side and has a negative power, disposed in this order from the object side; and
the zoom lens simultaneously satisfies conditional expressions (1) and (2) given below:

$$1.77 < Nd31 \qquad (1); \text{ and}$$

$$0.8 < f3/(fw \cdot ft)^{1/2} < 1.6 \qquad (2),$$

where:
Nd31 is a refractive index of the third group first lens with respect to d-line;
f3 is a focal length of the third lens group;
fw is a focal length of the overall lens system at a wide angle end; and
ft is a focal length of the overall lens system at a telephoto end.

2. The zoom lens of claim 1, wherein the zoom lens satisfies a conditional expression (10) given below:

$$0.5 < f4/(fw \cdot ft)^{1/2} < 1.2 \qquad (10),$$

where:
f4 is a focal length of the fourth lens group;
fw is a focal length of the overall lens system at a wide angle end; and
ft is a focal length of the overall lens system at a telephoto end.

3. The zoom lens of claim 1, wherein the zoom lens satisfies a conditional expression (12) given below:

$$36 < vd31 < 52 \qquad (12),$$

where vd31 is an Abbe number of the third group first lens with respect to d-line.

TABLE 12

| Type of Conditional Expression | Formula in Conditional Expression | Value of Formula in Conditional Expression | | | | | | | | | | |
|---|---|---|---|---|---|---|---|---|---|---|---|---|
| | | Example 1 | Example 2 | Example 3 | Example 4 | Example 5 | Example 6 | Example 7 | Example 8 | Example 9 | Example 10 | Example 11 |
| (A1), (A2) | Nd31 | 1.80 | 1.86 | 1.80 | 1.77 | 1.77 | 1.80 | 1.80 | 1.80 | <u>1.74</u> | 1.80 | 1.80 |
| (B1), (B2) | f3/(fw · ft)$^{1/2}$ | 1.06 | 1.53 | 1.32 | 1.09 | 1.49 | 1.24 | 1.22 | 1.37 | 1.09 | 2.18 | 1.26 |
| (C1), (C2) | f4/(fw · ft)$^{1/2}$ | <u>0.92</u> | 0.68 | 0.72 | 0.80 | 0.71 | 0.71 | 0.68 | <u>1.06</u> | 0.82 | 0.59 | <u>0.95</u> |
| (D) | vd31 | 40.4 | 40.6 | 40.4 | 47.2 | 40.4 | 40.4 | 40.4 | 40.4 | 49.3 | 40.4 | 40.4 |
| (E) | Nd32 | 1.95 | 1.92 | 1.95 | 1.92 | 1.95 | 1.92 | 1.95 | 1.85 | 1.95 | 1.81 | 1.95 |
| (F) | vd32 | 18.0 | 20.9 | 18.0 | 18.9 | 18.0 | 18.9 | 18.0 | 28.3 | 18.0 | 25.4 | 18.0 |
| (G) | vd4p | 70.2 | 81.6 | 70.2 | 64.1 | 70.2 | 70.2 | 70.2 | 65.0 | 64.1 | 81.6 | 70.20 |
| (H) | f3/f4 | 1.15 | 2.25 | 1.83 | 1.36 | 2.10 | 1.75 | 1.79 | 1.29 | 1.76 | 3.69 | 1.33 |
| (I) | (R32f + R32r)/(R32f − R32r) | 5.62 | 7.65 | 5.15 | 6.25 | 6.90 | 4.12 | 5.11 | 3.59 | 6.71 | 1.03 | 5.69 |
| (J) | TL/ft | 0.84 | 0.75 | 0.80 | 0.79 | 0.80 | 0.79 | 0.65 | <u>1.42</u> | 0.80 | 0.80 | 1.01 |
| (K) | (R42f + R42r)/(R42f − R42r) | −1.62 | −4.94 | −5.15 | −5.28 | −5.51 | −5.62 | −4.99 | −3.98 | −5.28 | −1.92 | −2.33 |
| (L) | f1/ft | 0.41 | 0.32 | 0.36 | 0.37 | 0.36 | 0.36 | 0.30 | <u>1.59</u> | 0.37 | 0.35 | 0.48 |
| (M) | \|f2\|/(fw · ft)$^{1/2}$ | 0.31 | 0.28 | 0.30 | 0.29 | 0.31 | 0.29 | 0.27 | <u>0.40</u> | 0.29 | 0.34 | 0.35 |

* Values not satisfy conditional expressions (A1), (B1), (C1), (D)~(M) are underlined.

What is claimed is:

1. A zoom lens, substantially consisting of a first lens group which has a positive power and is fixed at the time of zoom-

4. The zoom lens of claim 1, wherein the zoom lens simultaneously satisfies conditional expressions (13) and (14) given below:

$1.80 < Nd32$ (13); and $16 < vd32 < 27$ (14), where:
Nd32 is a refractive index of the third group second lens with respect to d-line; and
vd32 is an Abbe number of the third group second lens with respect to d-line.

5. The zoom lens of claim 1, wherein:
the fourth lens group is composed of at least one lens having a positive power and satisfies a conditional expression (15) given below:

$63 < vd4p$ (15), where vd4p is a highest Abbe number of those of the positive lenses in the fourth lens group with respect to d-line.

6. The zoom lens of claim 1, wherein the zoom lens satisfies a conditional expression (16) given below:

$0.9 < f3/f4 < 2.5$ (16), where:
f3 is a focal length of the third lens group; and
f4 is a focal length of the fourth lens group.

7. The zoom lens of claim 1, wherein the zoom lens satisfies a conditional expression (17) given below:

$3.2 < (R32f + R32r)/(R32f - R32r) < 8.0$ (17), where:
R32f is a radius of curvature of an object side surface of the third group second lens; and
R32r is a radius of curvature of an image side surface of the third group second lens.

8. The zoom lens of claim 1, wherein the zoom lens satisfies a conditional expression (18) given below:

$0.62 < TL/ft < 1.10$ (18), where:
TL is a distance from a most object side lens surface in the first lens group to an image forming plane on the optical axis; and
ft is a focal length of the overall lens system at a telephoto end.

9. The zoom lens of claim 1, wherein the fourth lens group is composed of two positive lenses and one negative lens.

10. The zoom lens of claim 9, wherein each lens disposed in the fourth lens group is a double-sided spherical single lens.

11. The zoom lens of claim 1, wherein the fourth lens group is composed of a fourth group first lens having a positive power, a fourth group second lens having a negative power, and a fourth group third lens having a positive power, disposed in this order from the object side.

12. The zoom lens of claim 11, wherein the zoom lens satisfies a conditional expression (19) given below:

$-6.0 < (R42f + R42r)/(R42f - R42r) < -1.3$ (19), where:
R42f is a radius of curvature of an object side surface of the fourth group second lens; and
R42r is a radius of curvature of an image side surface of the fourth group second lens.

13. The zoom lens of claim 1, wherein the first lens group is composed of a first group first lens having a negative power, a first group second lens having a positive power, a first group third lens having a positive power, and a first group fourth lens having a positive power, disposed in this order from the object side.

14. The zoom lens of claim 1, wherein the zoom lens satisfies a conditional expression (20) given below:

$0.25 < f1/ft < 0.50$ (20), where:
f1 is a focal length of the first lend group; and
ft is a focal length of the overall lens system at a telephoto end.

15. The zoom lens of claim 1, wherein the zoom lens satisfies a conditional expression (21) given below:

$0.25 < |f2|/(fw \cdot ft)^{1/2} < 0.45$ (21), where:
f2 is a focal length of the second lens group;
fw is a focal length of the overall lens system at a wide angle end; and
ft is a focal length of the overall lens system at a telephoto end.

16. An image pickup apparatus, comprising the zoom lens of claim 1.

17. A zoom lens, substantially consisting of a first lens group which has a positive power and is fixed at the time of zooming, a second lens group which has a negative power and is moved along an optical axis at the time of zooming, an aperture stop, a third lens group which has a positive power and is fixed at the time of zooming, and a fourth lens group which is moved along the optical axis at the time of zooming to correct a change in image plane position arising from the zooming for focusing, disposed in this order from an object side, wherein:
the third lens group is composed of a third group first lens which is a single lens with at least one surface being aspheric and has a positive power and a third group second lens which is a single lens with an image side surface being concave to the image side and has a negative power, disposed in this order from the object side; and
the zoom lens simultaneously satisfies conditional expressions (3) and (4) given below:

$1.77 < Nd31$ (3); and $0.55 < f4/(fw \cdot ft)^{1/2} < 0.82$ (4), where:
Nd31 is a refractive index of the third group first lens with respect to d-line;
f4 is a focal length of the fourth lens group;
fw is a focal length of the overall lens system at a wide angle end; and
ft is a focal length of the overall lens system at a telephoto end.

18. The zoom lens of any of claim 17, wherein the zoom lens satisfies a conditional expression (11) given below:

$0.8 < f3/(fw \cdot ft)^{1/2} < 2.3$ (11), where:
f3 is a focal length of the third lens group;
fw is a focal length of the overall lens system at a wide angle end; and
ft is a focal length of the overall lens system at a telephoto end.

19. The zoom lens of claim 17, wherein the zoom lens satisfies a conditional expression (12) given below:

$36 < vd31 < 52$ (12), where vd31 is an Abbe number of the third group first lens with respect to d-line.

20. An image pickup apparatus, comprising the zoom lens of claim 17.

* * * * *